US011343295B2

(12) United States Patent
Garmark et al.

(10) Patent No.: US 11,343,295 B2
(45) Date of Patent: *May 24, 2022

(54) SYSTEMS AND METHODS FOR PROVIDING SONG SAMPLES

(71) Applicant: Spotify AB, Stockholm (SE)

(72) Inventors: Sten Garmark, Stockholm (SE);
Quenton Cook, Stockholm (SE);
Gustav Söderström, Stockholm (SE);
Ivo Silva, Stockholm (SE); Michelle Kadir, Stockholm (SE); Peter Strömberg, Stockholm (SE)

(73) Assignee: Spotify AB, Stockholm (SE)

( * ) Notice: Subject to any disclaimer, the term of this patent is extended or adjusted under 35 U.S.C. 154(b) by 5 days.

This patent is subject to a terminal disclaimer.

(21) Appl. No.: 16/920,292

(22) Filed: Jul. 2, 2020

(65) Prior Publication Data

US 2020/0404037 A1  Dec. 24, 2020

Related U.S. Application Data

(63) Continuation of application No. 16/125,477, filed on Sep. 7, 2018, now Pat. No. 10,742,701, which is a
(Continued)

(51) Int. Cl.
*H04L 29/06* (2006.01)
*H04L 29/08* (2006.01)
(Continued)

(52) U.S. Cl.
CPC .............. *H04L 65/60* (2013.01); *G06F 3/165* (2013.01); *H04L 29/06* (2013.01);
(Continued)

(58) Field of Classification Search
CPC ... H04L 65/60; H04L 29/06; H04L 29/08072; H04L 61/2007; H04L 69/329;
(Continued)

(56) References Cited

U.S. PATENT DOCUMENTS 5,586,216 A * 12/1996 Degen ..................... G06F 3/16
704/276
5,903,727 A   5/1999 Nielsen
(Continued)

FOREIGN PATENT DOCUMENTS

EP   2045704   4/2009
EP   2226715   9/2010
(Continued)

OTHER PUBLICATIONS

Garmark, Office Action, U.S. Appl. No. 14/053,443, dated Apr. 27, 2015, 10 pgs.
(Continued)

*Primary Examiner* — Azizul Choudhury
(74) *Attorney, Agent, or Firm* — Morgan, Lewis & Bockius LLP

(57) ABSTRACT

An electronic device includes one or more processors and memory storing one or more programs. The one or more programs include instructions for presenting, on a first playback component coupled with the electronic device, a first media content item and receiving an input to preview a second media content item. The one or more programs include instructions for, in accordance with a determination that the electronic device is in a first mode of operation, while the first media content item is presented on the first playback component, presenting a preview of the second media content item on a second playback component. The one or more programs include instructions for, in accordance with a determination that the electronic device is not in the first mode of operation: ceasing presentation of the first media content item and presenting the preview of the second media content item.

20 Claims, 17 Drawing Sheets

Related U.S. Application Data continuation of application No. 15/132,142, filed on Apr. 18, 2016, now Pat. No. 10,075,496, which is a continuation of application No. 14/060,495, filed on Oct. 22, 2013, now Pat. No. 9,319,445.

(60) Provisional application No. 61/717,065, filed on Oct. 22, 2012.

(51) Int. Cl.

| | |
|---|---|
| *H04N 21/433* | (2011.01) |
| *H04N 21/443* | (2011.01) |
| *H04N 21/472* | (2011.01) |
| *H04N 21/81* | (2011.01) |
| *H04N 21/845* | (2011.01) |
| *G06F 3/16* | (2006.01) |
| *H04L 29/12* | (2006.01) |
| *H04N 21/442* | (2011.01) |
| *H04N 21/6377* | (2011.01) |
| *G06F 3/0484* | (2022.01) |
| *H04L 65/60* | (2022.01) |
| *H04L 69/329* | (2022.01) |
| *H04L 9/40* | (2022.01) |
| *H04L 61/5007* | (2022.01) |
| *G06F 3/04842* | (2022.01) |

(52) U.S. Cl.
CPC .... *H04L 29/08072* (2013.01); *H04L 61/2007* (2013.01); *H04L 69/329* (2013.01); *H04N 21/4331* (2013.01); *H04N 21/4438* (2013.01); *H04N 21/47202* (2013.01); *H04N 21/8113* (2013.01); *H04N 21/8133* (2013.01); *H04N 21/8456* (2013.01); *G06F 3/04842* (2013.01); *H04N 21/44204* (2013.01); *H04N 21/6377* (2013.01)

(58) Field of Classification Search
CPC . G06F 3/165; G06F 3/04842; H04N 21/4331; H04N 21/4438; H04N 21/47202; H04N 21/8113; H04N 21/8133; H04N 21/8456; H04N 21/44204; H04N 21/6377
See application file for complete search history.

(56) References Cited

U.S. PATENT DOCUMENTS

| | | | |
|---|---|---|---|
| 6,363,204 | B1 | 3/2002 | Johnson et al. |
| 7,571,014 | B1 | 8/2009 | Lambourne et al. |
| 7,730,405 | B2* | 6/2010 | Gulli ............... G06F 16/738 715/719 |
| 8,311,655 | B2 | 11/2012 | Ban |
| 8,321,784 | B1 | 11/2012 | Ranganathan et al. |
| 8,435,118 | B2 | 5/2013 | Beerhorst |
| 9,319,445 | B2 | 4/2016 | Garmark et al. |
| 9,749,709 | B2* | 8/2017 | Fino ............... F01N 3/0218 |
| 2003/0126605 | A1 | 7/2003 | Betz et al. |
| 2005/0114374 | A1 | 5/2005 | Juszkiewicz et al. |
| 2006/0069617 | A1 | 3/2006 | Milener et al. |
| 2006/0230229 | A1 | 10/2006 | Getzinger |
| 2006/0265349 | A1 | 11/2006 | Hicken |
| 2007/0016611 | A1 | 1/2007 | Wang |
| 2007/0130159 | A1 | 6/2007 | Gulli et al. |
| 2007/0282902 | A1* | 12/2007 | Bustelo ............ G06F 16/639 |
| 2007/0294297 | A1 | 12/2007 | Kesteloot et al. |
| 2008/0022229 | A1 | 1/2008 | Bhumkar et al. |
| 2008/0046937 | A1 | 2/2008 | Smith et al. |
| 2008/0066102 | A1* | 3/2008 | Abraham ........ H04N 21/4316 725/37 |
| 2008/0107400 | A1 | 5/2008 | Jung |
| 2008/0177994 | A1 | 7/2008 | Mayer |
| 2008/0235594 | A1 | 9/2008 | Bhumkar et al. |
| 2008/0271095 | A1 | 10/2008 | Shafton |
| 2008/0320419 | A1 | 12/2008 | Matas et al. |
| 2009/0106700 | A1 | 4/2009 | Nobori et al. |
| 2009/0158198 | A1 | 6/2009 | Hayter et al. |
| 2009/0228919 | A1 | 9/2009 | Zott et al. |
| 2009/0272253 | A1 | 11/2009 | Yamashita et al. |
| 2010/0159425 | A1 | 6/2010 | Hamlin |
| 2010/0229094 | A1 | 9/2010 | Nakahjima et al. |
| 2011/0037714 | A1 | 2/2011 | Seo et al. |
| 2011/0113331 | A1 | 5/2011 | Herberger et al. |
| 2011/0118858 | A1 | 5/2011 | Rottler et al. |
| 2011/0234480 | A1 | 9/2011 | Fino et al. |
| 2012/0042007 | A1 | 1/2012 | Weel |
| 2012/0078398 | A1 | 3/2012 | Xu et al. |
| 2012/0173981 | A1 | 7/2012 | Day |
| 2012/0210214 | A1 | 8/2012 | Yoo et al. |
| 2012/0213495 | A1 | 8/2012 | Hafeneger et al. |
| 2012/0307150 | A1 | 12/2012 | Verchykov |
| 2012/0311444 | A1 | 12/2012 | Chaudhri |
| 2013/0290818 | A1 | 10/2013 | Arrasvuori et al. |
| 2013/0317635 | A1 | 11/2013 | Bates et al. |
| 2013/0326583 | A1 | 12/2013 | Freihold et al. |
| 2013/0328925 | A1 | 12/2013 | Latta et al. |
| 2014/0035831 | A1 | 2/2014 | Fino |
| 2014/0122589 | A1 | 5/2014 | Fyke et al. |
| 2014/0181199 | A1 | 6/2014 | Kumar et al. |
| 2014/0181656 | A1 | 6/2014 | Kumar et al. |
| 2014/0229894 | A1 | 8/2014 | Vinna et al. |
| 2014/0347326 | A1 | 11/2014 | Yim et al. |

FOREIGN PATENT DOCUMENTS

| | | |
|---|---|---|
| EP | 2323134 A1 | 5/2011 |
| EP | 2434491 | 3/2012 |
| WO | WO 02/100117 | 12/2002 |

OTHER PUBLICATIONS

Garmark, Notice of Allowance, U.S. Appl. No. 14/053,443, dated Dec. 7, 2015, 5 pgs.
Garmark, Office Action, U.S. Appl. No. 14/231,170, dated Jun. 26, 2014, 21 pgs.
Garmark, Final Office Action, U.S. Appl. No. 14/231,170, dated Oct. 28, 2014, 27 pgs.
Garmark, Office Action, U.S. Appl. No. 14/231,170, dated May 7, 2015, 28 pgs.
Garmark, Final Office Action, U.S. Appl. No. 14/231,170, dated Sep. 17, 2015, 21 pgs.
Garmark, Office Action, U.S. Appl. No. 14/231,170, dated Feb. 9, 2016, 20 pgs.
Garmark, Office Action, U.S. Appl. No. 14/231,203, dated Jun. 18, 2014, 11 pgs.
Garmark, Final Office Action, U.S. Appl. No. 14/231,203, dated Oct. 28, 2014, 14 pgs.
Garmark, Office Action, U.S. Appl. No. 14/231,203, dated May 13, 2015, 15 pgs.
Garmark, Final Office Action, U.S. Appl. No. 14/231,203, dated Sep. 17, 2015, 15 pgs.
Garmark, Office Action, U.S. Appl. No. 14/060,495, dated Jul. 27, 2015, 17 pgs.
Garmark, Notice of Allowance, U.S. Appl. No. 14/060,495, dated Jan. 13, 2016, 5 pgs.
Garmark, Office Action, U.S. Appl. No. 15/132,142, dated Aug. 11, 2017, 13 pgs.
Garmark, Final Office Action, U.S. Appl. No. 15/132,142, dated Dec. 1, 2017, 15 pgs.
Garmark, Notice of Allowance, U.S. Appl. No. 15/132,142, dated May 10, 2018, 5 pgs.
Garmark, Office Action, U.S. Appl. No. 15/006,816, dated Feb. 28, 2018, 16 pgs.
Garmark, Final Office Action, U.S. Appl. No. 15/006,816, dated Sep. 7, 2018, 16pags.
Garmark, Office Action, U.S. Appl. No. 15/006,816, dated Nov. 16, 2018, 15 pgs.

(56) References Cited

OTHER PUBLICATIONS

Garmark, Office Action, U.S. Appl. No. 16/125,477, dated Oct. 4, 2019, 8 pgs.
Spotify AB, International Search Report and Written Opinion, PCT/IB2013/002887, dated Mar. 21, 2014, 11 pgs.
Spotify AB, Invitation to Pay Additional Fees, PCT/IB2013/002808, dated Mar. 5, 2014, 7pgs.
"YouTube Embedded Players and Player Parameters Contents," Jun. 4, 2012 retrieved from the Internet on May 26, 2014: https://developers.gogogle.com/youtube/player_parameters, 11 pgs.
Spotify AB, International Search Report, PCT/IB2013/002808, dated Jun. 5, 2014, 6 pgs.
Spotify AB, Written Opinion, PCT/IB2013/002808, dated Jun. 5, 2014, 16 pgs.
Spotify AB, International Preliminary Report on Patentability, PCT/IB2013/002808, dated Apr. 14, 2015, 16 pgs.

* cited by examiner

SYSTEMS AND METHODS FOR PROVIDING SONG SAMPLES

RELATED APPLICATION

This application is a continuation of U.S. application Ser. No. 16/125,477, filed Sep. 7, 2018, entitled "Systems And Methods For Providing Song Samples," which is a continuation of U.S. application Ser. No. 15/132,142, filed Apr. 18, 2016, entitled "Systems And Methods For Providing Song Samples," (U.S. Pat. No. 10,075,496) which is a continuation of U.S. application Ser. No. 14/060,495, filed Oct. 22, 2013, entitled "Systems And Methods For Pre-Fetching Media Content," (U.S. Pat. No. 9,319,445) which claims priority and benefit to U.S. Provisional Application No. 61/717,065, filed Oct. 22, 2012, entitled "Systems And Methods For Multi-Context Media Control And Playback," each of which is herein fully incorporated by reference in its respective entirety.

This application is related to U.S. Provisional Application No. 61/713,444, filed Oct. 12, 2012, entitled "Systems and Methods For Multi-Context Media Control And Playback," and U.S. application Ser. No. 14/053,443, filed Oct. 14, 2013, entitled "Systems And Methods For Multi-Context Media Control And Playback," (U.S. Pat. No. 9,246,967) each of which is herein fully incorporated by reference in its respective entirety.

TECHNICAL FIELD

The disclosed implementations relate generally to controlling and playing back media content.

BACKGROUND

Modern users have a variety of options for devices and ways to consume media content. For example, multiple different types of media, including text, still images, video, audio, and other digital media, can be consumed on personal computers, laptops, mp3 players, mobile phones, tablet computers, televisions, stereos, and many other electronic devices. These electronic devices typically have the ability to store digital media files in memory that is integrated into the devices. But acquiring and storing all the media content to which a user desires access can be prohibitively difficult and expensive.

Current technology also allows users to stream digital media content to their electronic devices over local networks or the Internet, for example, including over wireless connections. Streaming services allow users to have access to a much larger collection of media than would otherwise be possible. Streaming services store media content on servers remote from the electronic devices, and then send the media content to the electronic devices when it is requested. The media content is then cached on the electronic device for presentation. In some cases, the content may be temporarily buffered/stored before presentation, but typically the data is deleted from memory after presentation, allowing an almost unlimited amount of media to be streamed to a device without running out of storage space on the electronic device. Some streaming services also allow streamed content to be stored on the local device.

As more and more devices are capable of streaming media content from remote servers, as well as storing media content locally, it is often cumbersome to manage all of the different sources of media to which a user has access. Moreover, even where a user has multiple devices that can access the same content (for example, a handheld device and a laptop computer that can both access a media streaming service), each device must typically be controlled with its own dedicated interface. Accordingly, it would be advantageous to provide systems and methods that allow a user to remotely control various electronic devices in a simple and intuitive manner.

Furthermore, as users are increasingly using computers and other electronic devices to browse and consume media content, it is beneficial to increase the ease and convenience with which media content can be browsed, previewed, and selected for presentation. For example, when browsing in a media store, previews of media content may be available so that the user can listen to a portion of a song or watch a portion of a video before choosing to purchase it or otherwise select it for presentation. However, previewing media content may be inconvenient when media content is already being presented, such as when a user is browsing an online music store while listening to other music. Accordingly, it would be advantageous to provide systems and methods that allow a user to preview media content in a convenient and streamlined manner.

SUMMARY

Accordingly, systems and methods for pre-fetching media content are described which allow media content to be provided to a user with little delay between a request for the media content and the output of the media content. Various heuristics can be used to determine what media content items are likely to be selected by a user for preview and/or presentation at any given time, and, thus, what media content items should be pre-fetched. Accordingly, the determined media content items (or a portion thereof) can then be downloaded, cached, or otherwise made available to the user's device—before the user actually selects the media content item for playback—to provide rapid playback initiation if and when such media content is selected.

One exemplary technique for determining when to pre-fetch a media content item (or a portion thereof) is to detect changes in the user interface with which the user is browsing media content. In particular, certain changes in the user interface can indicate that a particular media content item is likely to be selected, and, therefore, that the particular media content item should be pre-fetched. For example, a streaming music browsing interface can include pictures corresponding to the album art associated with displayed media content (e.g., tracks, albums, etc.). When a cursor hovers over a particular album art image for a certain amount of time, it is a reasonable assumption that the user will request playback of that particular media content item. In another example, when an identifier of a media content item is initially displayed to a user (e.g., because the user scrolled down in a browsing interface, such as a webpage or an application interface), it is a reasonable assumption that the user will request playback of that media content item. In both examples, in response to detecting one or more of these conditions, all or a portion of that media content item can be downloaded to the user device so that, when and if the user actually does select the media content item for preview or playback, it is played back quickly and without the delays associated with downloading or buffering the media content item. Other heuristics for determining what media content to pre-fetch are also described herein.

EXEMPLARY IMPLEMENTATIONS

In accordance with some implementations, a method of previewing media content is disclosed. In some implementations, the method is performed at an electronic device having one or more processors and memory storing instructions for execution by the one or more processors. The method includes detecting a first input. In some implementations, the first input is a contact with a touch-sensitive surface. In some implementations, the first input is a mouse click event. In some implementations, in addition to clicking and touching, the first input including moving the mouse pointer over an area without clicking. In response to determining that a change to the first input has been detected within a first time period after detecting the first input, first media content is added to a playlist. In some implementations, the change to the first input is a liftoff from a touch-sensitive surface. In some implementations, the change to the first input is a mouse click-release event. In some implementations, the change to the first input is an addition of another input. In response to determining that a change to the first input has not been detected within the first time period after detecting the first input, the first media content is caused to be presented. In some implementations, the first media content is presented at the same device that received the input (e.g., a computer, television, or mobile phone). In some implementations, the first media content is presented at a different device (e.g., a home stereo system or wireless speaker system).

In accordance with some implementations, a method of previewing media content is disclosed. In some implementations, the method is performed at an electronic device having one or more processors and memory storing instructions for execution by the one or more processors. The method includes, during presentation of a first song, detecting a first input. In some implementations, the first input is a touch input, mouse input, or other appropriate input. The audibility of the first song is reduced. In some implementations, the audibility is reduced by lowering the volume of, muting, or pausing the first song. A second song is presented. After a first time period, presentation of the second song is ceased. In some implementations, the first time period corresponds to the duration of the first input. For example, the first input can correspond to a touch- or click-and-hold input, and the second song is presented as long as the input is maintained. The audibility of the first song is then increased. In some implementations, the first song is presented at the same or substantially the same audibility as it was prior to presenting the second song.

In accordance with some implementations, a method of previewing media content is disclosed. In some implementations, the method is performed at an electronic device having one or more processors and memory storing instructions for execution by the one or more processors. The method includes, during presentation of currently presented media content, displaying an affordance to a user, where selection of the affordance will cause secondary media content to be presented. For example, the affordance may be a button, icon, or text that, when selected, causes secondary media content to be previewed or otherwise presented. In response to displaying the affordance, at least a portion of secondary media content is obtained. In some implementations, the portion of the secondary media content is obtained at the same device on which the affordance is displayed. In some implementations, it is obtained at a different device. A first input corresponding to a selection of the affordance is detected. The audibility of the currently presented media content is reduced, and the secondary media content is presented. After a first time period, the presentation of the secondary media content is ceased, and the audibility of the currently presented media content is increased.

In accordance with some implementations, a method of previewing media content is disclosed. In some implementations, the method is performed at an electronic device having one or more processors and memory storing instructions for execution by the one or more processors. The method includes detecting the presence of a cursor in a first area of a display. In some implementations, the first area of the display corresponds to an icon, button, graphic, text, or other type of control, and can be displayed in a media content description area, including, for example, album art, movie stills, content metadata, and the like. Media content is presented in response to detecting the presence of the cursor within the first area. The removal of the cursor from a second area of the display region is detected, where the second area is larger than and contiguous with the first area. In some implementations, the second area corresponds to the media content description area. In some implementations, it is the same size as the media content description area. The media content is presented in response to detecting the removal of the cursor from the second area.

In accordance with some implementations, a method of controlling media presentation is disclosed. In some implementations, the method is performed at a first electronic device having one or more processors and memory storing one or more programs for execution by the one or more processors. The first electronic device receives a media control command for a second electronic device. In response to receiving the media control command, the server sends a server media control request to a server system, and sends a local media control request to a second electronic device within a local network to which both the first electronic device and the second electronic device are connected. Local networks may be Local Area Networks (LANs), Personal Area Networks (PANs), ad-hoc computer networks, peer-to-peer computer networks, and the like, and may be wired or wireless. Local networks may use one or more communication standards, protocols, or technologies, such as Internet Protocol (e.g., including Transmission Control Protocol, User Datagram Protocol, Internet Control Message Protocol, Hypertext Transfer Protocol, etc.), BLUETOOTH, Wired Ethernet (e.g., IEEE 802.3), Wireless Fidelity (Wi-Fi) (e.g., IEEE 802.11a, IEEE 802.11b, IEEE 802.11g, and/or IEEE 802.11n), or any other suitable communication protocol, including communication protocols not yet developed as of the filing date of this document. For example, in some implementations, two nearby devices in communication with one another via BLUETOOTH communication technologies constitutes a local network.

In some implementations, the server media control request is sent to the server system over the Internet. In some implementations, the first electronic device provides a single user interface that allows a user both to select media content for presentation by the first electronic device and to generate media control requests configured to cause the media content to be presented by the second electronic device.

Media content is selected from the group consisting of: an audio track, a video, an image, an audio playlist, and a video playlist. In some implementations, the first electronic device is selected from the group consisting of: a computer, a mobile phone, a remote control device, and a portable media player. In some implementations, the second electronic device is selected from the group consisting of: a television, a home media receiver/player, a computer, a home audio/visual system, and a speaker. In some implementations, the server and the local media control requests are both configured to cause a single media control operation to be implemented at the second electronic device. In some implementations, the media control operation is selected from the group consisting of: play, pause, skip, fast-forward, rewind, adjust an audio volume, change an order of items in a playlist, add items to a playlist, remove items from a playlist, adjust audio equalizer settings, and set a user setting.

In accordance with some implementations, another method of controlling media presentation is disclosed. In some implementations, the method is performed at a second electronic device having one or more processors and memory storing one or more programs for execution by the one or more processors. The second electronic device receives, from a server system, a server media control request corresponding to a media control operation to be implemented at the second electronic device, wherein the server media control request was sent from the server in response to the server receiving the server media control request from a first electronic device. The second electronic device receives, from the first electronic device, a local media control request sent within a local network to which both the first electronic device and the second electronic device are connected, wherein the local media control request corresponds to the media control operation.

In some implementations, the server media control request is received prior to the local media control request. In response to receiving the server media control request, the second electronic device performs the media control operation. After receiving the local media control request, the second electronic devices determines whether the server media control request and the local media control request correspond to the same media control operation. If the server media control request and the local media control request correspond to the same media control operation, the server ignores the local media control request.

In some implementations, the media control operation is a request to begin presenting media content at the second electronic device, and the media content is being presented by the first electronic device. Prior to receiving the server media control request or the local media control request, the second electronic device buffers/caches an upcoming portion of the media content being presented by the first electronic device. The second electronic device receives one of the server media control request or the local media control request. The second electronic device initiates presentation of the buffered portion of the media content.

In accordance with some implementations, another method of controlling media presentation is disclosed. In some implementations, the method is performed at a second electronic device having one or more processors and memory storing one or more programs for execution by the one or more processors. The second electronic device receives, from a first electronic device, a local media control request corresponding to a media control operation, wherein the local media control request is sent within a local network to which both the first electronic device and the second electronic device are connected. The second electronic device receives a media stream from a server system, wherein the media stream was sent from the server in response to the server receiving a server media control request from the first electronic device, and wherein the server media control request corresponds to the media control operation.

In some implementations, the media stream is received prior to receiving the local media control request. In response to a determination that the local media control request corresponds to a request to initiate presentation of the media stream, the second electronic devices ignores the local media control request.

In accordance with some implementations, another method of controlling media presentation is disclosed. In some implementations, the method is performed at a server system having one or more processors and memory storing one or more programs for execution by the one or more processors. The server system receives, from a first electronic device, a server media control request, wherein the first electronic device also sends a local media control request to the second electronic device within a local network to which both the first electronic device and the second electronic device are connected, and wherein the server media control request and the local media control request are both configured to initiate a same media control operation by the second electronic device. The server system sends at least one of the server media control request or a media stream corresponding to the server media control request to the second electronic device.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

Figure 1:
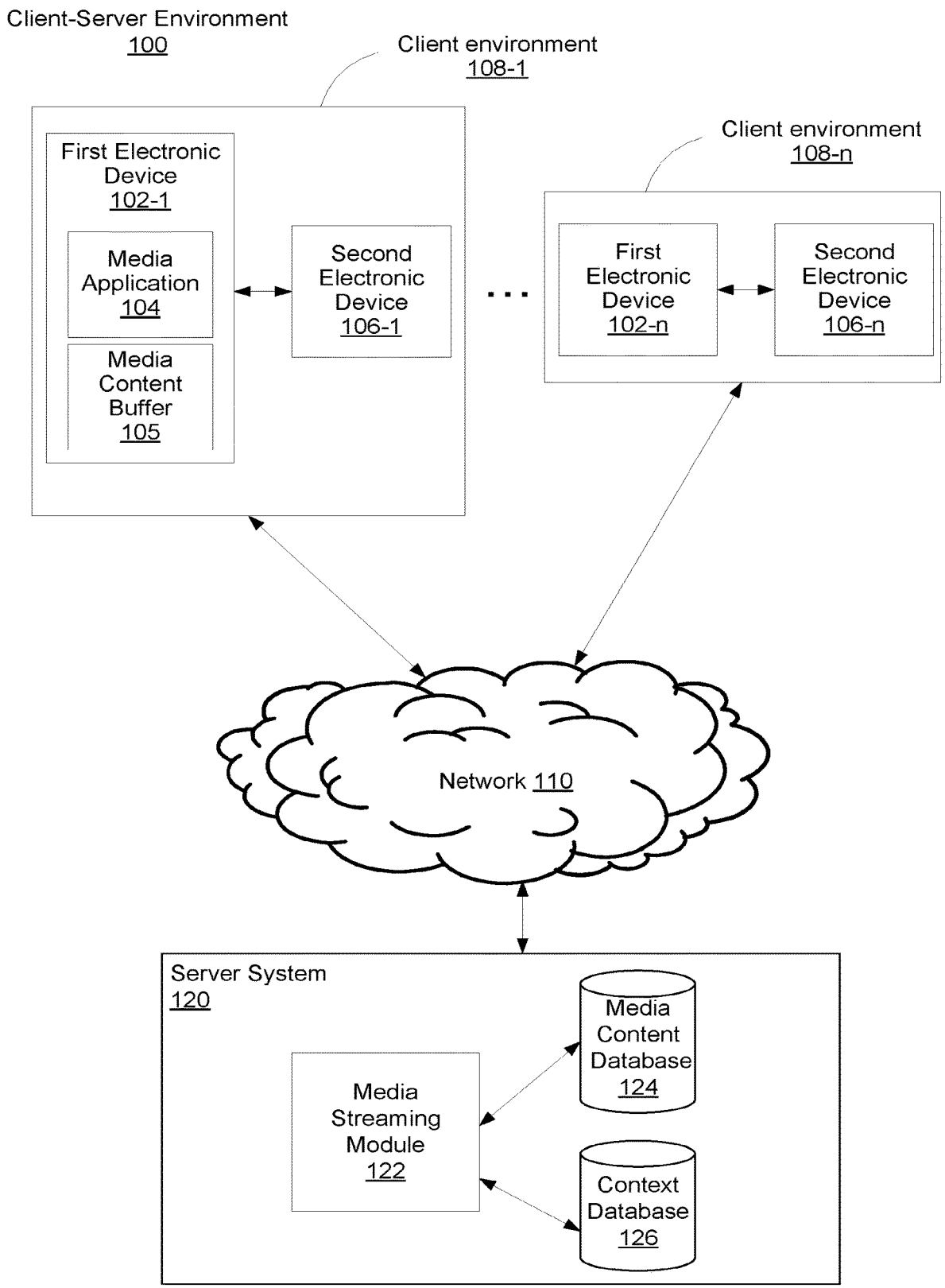
FIG. 1 is a block diagram illustrating a server client environment in accordance with some implementations.

The various implementations described herein enable a first electronic device to remotely control media presentation at a second electronic device. In some implementations, the disclosed systems and methods enable a user with a first electronic device to use the first electronic device to playback media content, and also to use the first electronic device to cause media content to be presented by a second electronic device. For example, a user may use a mobile phone to listen to music. The user may also use the same mobile phone as a remote control to control the playback (and/or other functionalities) of a second device, such as a laptop computer, a desktop computer, a home media receiver/player, or a home audio/visual system. Thus, the first device, which is separate and distinct from the second device, can both present media and control other media devices.

In order to cause media control operations to be performed at a second electronic device, the first electronic device sends media control requests to the second electronic device. Media control requests are communications configured to cause some media control operation, such as initiating or controlling media content playback (e.g., play, stop, pause, change volume, skip, etc.). Increasingly, homes, businesses, and other locations provide local communications networks, such as a wireless or wired Ethernet network, a BLUETOOTH network, or the like, to which multiple devices are connected. Accordingly, a person's mobile phone, home media system, computer, television, etc., may all be connected to the same local communications network, allowing these devices to communicate with each other and with other devices outside the local communications network (e.g., on the Internet) to send and receive the media control requests.

In some implementations, the first device sends media control requests to the second device through multiple channels, such as through a central server as well as via a local network. This may increase the speed and reliability of the media control requests, thus creating a more responsive and robust remote-control system for the user. Additionally, sending the media control requests via the different paths (e.g., through a local network as well as through the wider Internet) ensures that the remote control functionality operates properly under many different network connectivity situations. For example, if a user's local wireless network (e.g., a wireless LAN, PAN, etc.) is not configured to allow a handheld device to communicate directly to another media playing device, media control requests are still sent from the handheld device, through the Internet (e.g., through a cellular data network), to the other media playing device. If, on the other hand, the handheld device does not have access to the Internet, but the user's local wireless network is configured to allow direct communication between devices, the media control requests are still sent to the other media playing device despite the lack of Internet access. Accordingly, in some implementations described herein, media control requests are sent from a first electronic device to a server system located remotely from the first electronic device. The server system then causes a second electronic device to present media in accordance with the request from the first electronic device.

As noted above, in some implementations, the first and second electronic devices are located on the same local network. In some implementations, the local network is a Local Area Network (LAN). In some implementations, a LAN is a type of local network that creates IP address space behind a traffic routing device (e.g., a wired or wireless router) and limits incoming connections based on the specific requirements for the Local Area Network. In some implementations, LANs facilitate connections between devices on the LAN without using a public domain name system. In some implementations, devices on a LAN communicate using TCP/IP protocols. In some cases, Local Area Networks are confined to a single building or a group of buildings in relatively small geographical proximity. In some implementations, the local network is a Personal Area Network (PAN). In some implementations, a PAN is a network of devices that spans a relatively small geographical distance, such as a few inches or yards. In some implementations, a PAN is established using a peer-to-peer and/or an ad-hoc network. In some implementations, devices in a peer-to-peer and/or ad-hoc network communicate using BLUETOOTH communications technology, wireless universal serial bus, infrared communication protocols, etc. Local networks may be wired or wireless.

In some implementations, the server system is located remotely from both the first and the second electronic device. For example, in some implementations, the server system is not located on the same local network (e.g., it is not in the same LAN, PAN, peer-to-peer network, ad-hoc network, etc.) as either the first electronic device or the second electronic device. Thus, the first and second electronic devices can communicate over a local network, as described above, while, in contrast, communication between the server system and the first and second electronic device is over a network such as the Internet.

Another feature of the disclosed ideas is that the same application, and even the same graphical user interface (GUI), can be used for both presenting media content by the first electronic device and for controlling the presentation of media by the second electronic device. This provides a seamless experience for the user, as the user does not need to use different control interfaces (e.g., buttons, touchscreens, remote controls, etc.) for each device, thus obviating the need for the user to learn and use different control interfaces, keyboard layouts, media control functionalities, and the like, for different devices.

Furthermore, in some implementations, a media control request is configured to change the active presentation device for media content that is currently being presented. For example, a user who is listening to a music playlist on a mobile phone can request to change the active listening device to a home stereo system. In some implementations, the request to change media presentation devices is initiated by a user (e.g., via a user interface on the mobile phone). In some implementations, the request is initiated automatically and without user intervention by automatically detecting a predetermined condition, such as location, date, time of day, and/or day of week. For example, if a user is listening to an audio playlist on a mobile phone while walking home, the user's home stereo system may begin playing back the audio instead of (or in addition to) the mobile phone once it is determined that she has arrived at her home (e.g., using a positioning system (e.g., a GPS, cell-tower triangulation, etc.), proximity sensors, inertial monitoring devices, etc.).

In some implementations, the switching occurs in response to the server system receiving notification from the first electronic device that a specific predetermined condition has been met. For example, the first electronic device may monitor its geographic location, and when it determines that it has moved into (or out of) a predefined area, the first electronic device will send a notification to the server system that the predetermined condition has been met. In another example, the condition is met when the server detects a change in the state of the first electronic device, such as when the first electronic device establishes communication with a particular wireless network, or when the first electronic device pairs with or detects the second electronic device. In response, the server system ceases transmitting the media content stream to the first electronic device and begins transmitting the media content stream to a second electronic device. In this way, the user is able to establish conditions for automatically changing the device to which media content is being streamed or stream between devices.

Automatic switching may also be conditioned on additional factors, such as whether a device on which presentation is to be initiated is already presenting other media content, a time of day, a time of week, etc. For example, continuing the previous example, if the home stereo system is already presenting media content when the user returns home, the home stereo system will not switch to the playlist that was being presented on the user's mobile phone. This, in this case, the home stereo is available to be automatically activated only when it is idle and/or not presenting other media content.

In some implementations, the active presentation device is configured to automatically change only during predetermined time or date ranges. For example, in some implementations, a home stereo system will automatically begin presenting media content only during daytime hours (e.g., between 10:00 AM and 8:00 PM), and/or during weekends.

In some implementations, different users have different priority levels for automatic device switching. This can help avoid frequent and annoying changes in media presentation due to different users returning home, entering a particular area, etc. In some implementations, when a user initiates presentation of media content at a device, the user's priority level is logged or stored. When another user attempts to initiate presentation of different media content at that device, the other user may do so only if his or her priority level is above the first user. In some implementations, priority levels are only used to determine whether automatic device switching may occur. Thus, if a lower-priority user returns home while listening to a certain playlist, but a higher-priority user is already listening to music (or presenting other media content) via the home stereo, the lower-priority user's playlist will not be automatically presented via the home stereo system. On the other hand, manual requests to change the media content being presented by the home stereo system may be implemented regardless of the priority level of the requestor.

In some implementations, media presentation devices can present media content regardless of the origin of the content. For example, content in the audio playlist in the preceding example may be stored on the mobile phone, and streamed to the home stereo system from the mobile phone (e.g., via a local connection, such as a wireless LAN, peer-to-peer connection, a public network such as the Internet, etc.). If the content in the audio playlist is being streamed from a separate source (e.g., a remote server associated with a media content provider, a local media server, etc.), then the source can simply switch the destination of the audio stream from the mobile phone to the home stereo system.

In some implementations, when the active presentation device is changed, media content is delivered to the active presentation device regardless of the origin of the content. For example, when a song in an active playlist is stored on the user's mobile phone (but presented by the user's home stereo system), the song will be streamed or otherwise provided by the mobile phone; when a song is stored on a user's network accessible storage (NAS) system, the song will be streamed or otherwise provided by the NAS; when a song in the playlist is stored in a remote server, that song will be streamed or otherwise provided by the remote server. Songs that are stored in different locations (e.g., on the mobile phone and the remote server) can be included in the same playlist, and can be streamed to whatever device is playing the playlist.

In some implementations, when the active presentation device is changed, the context of the content stream, originally available on the first presentation device, becomes available on the second presentation device. The context of a content stream includes various information about the content stream, including the position within the currently playing media content, the previously presented media content (e.g., a play history), the position within previously presented media content (if unfinished), the media content to be played next, metadata of the current or upcoming media content (e.g., artist, album, track), etc. For example, the media content, once playback is initiated at the second electronic device, will retain the position in the current media content item and the position of the active playlist. In this way the media stream being presented on the first device is seamlessly transferred to a new device while maintaining the same state as on the first device. Thus, users may easily switch between devices without fear of losing their place in a song, a movie, a playlist, etc.

In some implementations, when media content is being presented at one device, one or more other devices buffer/cache a portion of that media content, for example, in case the user should choose to present the media content with one of the other devices instead of or in addition to the current device. In this way, the other devices are able to begin presenting the media content quickly, as the media presentation can begin at the other device(s) as soon as they receive a request to do so, rather than waiting for communications to be established between a media content source and the presentation device, for initial buffering of streaming content prior to presentation, and the like.

In some implementations, a user can select media content for preview. For example, a user can select, at one device, a song, playlist, or album to preview on the same device or on a different device. In some implementations, any media content that is being presented when the preview is requested is muted, dimmed, or paused (or otherwise made less audible/visible) while the preview is presented. Accordingly, the user can preview the media content without the inconvenience of having to manually restart the earlier content playback and/or without losing their place in the earlier content playback. Content for a preview can be pre-fetched by downloading and caching/buffering at least a portion of the content in response to a preview control (e.g., a button) being presented to a user, such as when a user views media content in a media browser on an electronic device. Moreover, various user interfaces and techniques can be used to initiate a media content preview and/or to add media to an existing playlist. For example, touch-and-hold inputs on a touch screen interface can be used to initiate a preview, and touch-and-release inputs can be used to add content to a playlist. Various implementations of these and other ideas are discussed below.

Attention is now directed to the figures, and in particular to FIG. 1, which is a block diagram of a client-server environment, according to some implementations. The client-server environment 100 includes one or more client environments (108-1 ... 108-n) and a server system 120 that are connected through a network 110. In some implementations, the client environment 108-1 includes one or more electronic devices (e.g., first electronic device 102-1 and second electronic device 106-1). In some implementations, the server system 120 is associated with a media content provider to which users (and their electronic devices) may have accounts that enable the user to access media content from the server system 120. The network 110 includes any of a variety of networks, including wide area networks (WAN), wireless networks, wired networks, the Internet, or a combination of such networks.

In accordance with some implementations, the client environment 108-1 includes a first electronic device 102-1. In some implementations, the first electronic device 102-1 is one of the group of: a personal computer, a mobile electronic device, a laptop, a tablet computer, a mobile phone, a digital media player, or any other electronic device able to present media content.

In accordance with some implementations, the client environment 108-1 also includes a second electronic device 106-1. In some implementations, the second electronic device 106-1 is one of the group of: a computer, a home audio/visual system, a home media receiver/player, or any other electronic device able to present media content. In some implementations, both the first electronic device 102-1 and the second electronic device 106-1 are associated with a common user account (or associated user accounts) provided by a content provider with which the server system 120 is associated. For example, in some implementations, the server system 120 is operated and/or provided by a subscription-based media streaming service to which a user may have an account, and the first and second electronic devices 102-1, 106-1 are each associated with account credentials that enable them to communicate with and receive content from the server system 120.

In accordance with some implementations, both the first electronic device 102-1 and the second electronic device 106-1 are on the same local network. In some implementations, the local network is a Local Area Network. In some implementations, the server system 120 is not located on the same Local Area Network as either the first electronic device 102-1 or the second electronic device 106-1.

As noted above, Local Area Networks are often associated with a relatively small geographic area (e.g., one house or building) and create IP address space behind a traffic routing device. In some implementations, the traffic routing device uses network address translation to connect devices within the LAN to devices outside the LAN. Network address translation is the process of readdressing packets by modifying the IP address contained in each packet so that the packets reach their intended destination device. Network address translation allows a plurality of electronic devices on the Local Area Network to connect to the Internet through a single IP address (e.g., the IP address of the traffic routing device). The traffic routing device (i.e. a router) receives incoming packets, determines which device on the Local Area Network is the intended recipient, and modifies the IP address to correctly identify that device. For example, a Local Area Network has 9 devices with local IP addresses 192.168.0.1-192.168.0.9 that all connect to a router. The router connects to the Internet and has an IP address of 12.162.29.2. Using network address translation, the router translates the source address for all communications sent from any of the 9 devices and intended for destinations in the Internet to be 12.162.29.2 (the router's IP address). On the other hand, the router collects all packets incoming from the Internet, determines the intended recipient device based upon the contents of each packet, and translates the destination IP address to the address of the correct device on the Local Area Network. So when the intended device is the device with Local Area Network IP address 196.168.0.2, the router would change the destination address to this address. Local Area Networks also commonly use firewalls to limit incoming connections. In this way, computer devices outside of the Local Area Network are generally not able to communicate directly with the devices on a Local Area Network. Indeed, in some Local Area Networks the devices in the network are not contactable even by other devices in the Local Area Network.

In some implementations, both the first electronic device 102-1 and the second electronic device 106-1 are on the same Personal Area Network. In some implementations, the Personal Area Network uses BLUETOOTH communication technology. In some implementations, the server system 120 is not located on the same Personal Area Network as either the first electronic device 102-1 or the second electronic device 106-1.

In some implementations, the first electronic device 102-1 includes a media content presentation and control application 104 (hereinafter "media application"). The media application 104 is able to control the presentation of media by the electronic device 102-1. For example, the media application 104 enables a user to navigate media content items, select media content items for playback on the electronic device 102-1, create and edit playlists, etc. In some implementations, media content is stored by the first electronic device 102-1 itself. In other implementations, the media content is stored by a server system 120, which may be located remotely from the first electronic device 102-1. The media content is then streamed from the server system 120 to the first electronic device 102-1 over the network 110.

In some implementations, the data streamed from the server system 120 is temporarily stored/cached by the first electronic device 102-1 in the media content buffer 105 in the memory of the first electronic device 102-1. In some implementations, media content stored in the media content buffer 105 is removed after the media content is presented by the first electronic device 102-1, allowing new media content data to be stored in the buffer 110. In other implementations, at least some of the media content stored in the media content buffer 105 is retained for a predetermined amount of time after the content is presented by the first electronic device 102-1 and/or until other predetermined conditions are satisfied.

In some implementations, the media application 104 is also able to control media content presentation by the second electronic device 106-1, which is distinct from the first electronic device 102-1. Thus, the user is able to use the media application 104 to cause the electronic device 102-1 to act both as a media presentation device as well as a remote control for other media presentation devices. This allows a user to control media presentation on multiple electronic devices from within a single application 104, and/or using a single user interface.

In some implementations, when a user wants to use the first electronic device 102-1 to control media presentation by the second electronic device 106-1, the user interacts with the media application 104 to send a media control request (e.g., server media control request 112, FIG. 2) to the server system 120. The server system 120 receives the media control request over the network 110. For example, the user may press a button on a touchscreen of the first electronic device 102-1 in order to send the media control request to the server system 120 and/or directly to the second electronic device 106-1. As described below, a media control request is, for example, a request to begin presentation of media content by the second electronic device 106-1. Though often used herein to describe requests to initiate or begin presentation of media by the second electronic device 106-1, in some implementations, media control requests also include requests and/or signals to control other aspects of the media that is being presented on the second electronic device 106-1, including but not limited to commands to pause, skip, fast-forward, rewind, adjust volume, change the order of items in a playlist, add or remove items from a playlist, adjust audio equalizer settings, change or set user settings or preferences, provide information about the currently presented content, and the like.

The client-server environment 100 also includes a server system 120. In some implementations, the server system 120 includes a media streaming module 122, a media content database 124, and a context database 126. The media content database 124 stores media content that can be presented by an electronic device. For example, in some implementations, the media content database 124 stores audio (e.g., music, audiobooks, etc.), video (e.g., movies, television shows, etc.), images, or other content that can be streamed to other electronic devices. In some implementations, the media content database includes data stored in different formats and file types to allow a variety of different devices and/or applications to receive streamed content. In some implementations, the data is stored in a single file format and is converted/transcribed to the appropriate data type before or as it is streamed to a remote device.

In some implementations, the server system 120 includes a media streaming module 122. In some implementations, the media streaming module 122 receives media control requests from electronic devices and streams media content in response. In some implementations, the media streaming module 122 receives media control requests from a first electronic device 102-1 and forwards the request to a second electronic device 106-1, which then makes the final request to the server system 120 for the media content. For example, a user sends a media control request to the server using a mobile phone (a first electronic device) requesting that media be presented by a home stereo system (a second electronic device). The server system 120 then sends the requested media (and/or the media control request) to the home stereo system. This and other techniques are discussed in greater detail below with respect to FIGS. 5-8.

In some implementations, the received media control request includes information identifying the electronic device to which the server system 120 should forward the media control request. For example, a user may have multiple electronic devices that can present media from the server system 120, such as a mobile phone, a computer system, a television, a home stereo, etc. In some implementations, the identifying information is a unique or semi-unique device identifier, such as an IP address, a Media Access Control address (MAC address), a user-specified device name, an International Mobile Equipment Identity number (IMEI number), or the like. Accordingly, the media control request will identify that a request is intended for the home stereo, for example, so that the server system 120 can send the requested media and/or the media control request to the home stereo.

In some implementations, the server system 120 includes a context database 126. The context database 126 stores data associated with the presentation of media content by an electronic device. In some implementations, the context database 126 includes, among other things, the current position in a media content stream that is being actively presented by an electronic device, a playlist associated with the media content stream, previously played content, skipped pieces of media content, and previously indicated user preferences. For example, the context database may include information that a content stream to an electronic device currently is presenting a song, at 1 minute and 23 seconds into the song, as well as all the songs played in the last hour and the next 20 songs in the playlist. In some implementations, the server system 120 transmits the context associated with a media content stream to the device that is presenting the content stream so that one or more items of context information can be used by the device, such as for display to the user. In some implementations, when the device to which the media content is being streamed changes, the server system 120 transmits the context associated with the active media content to the newly active device.

Figure 2:
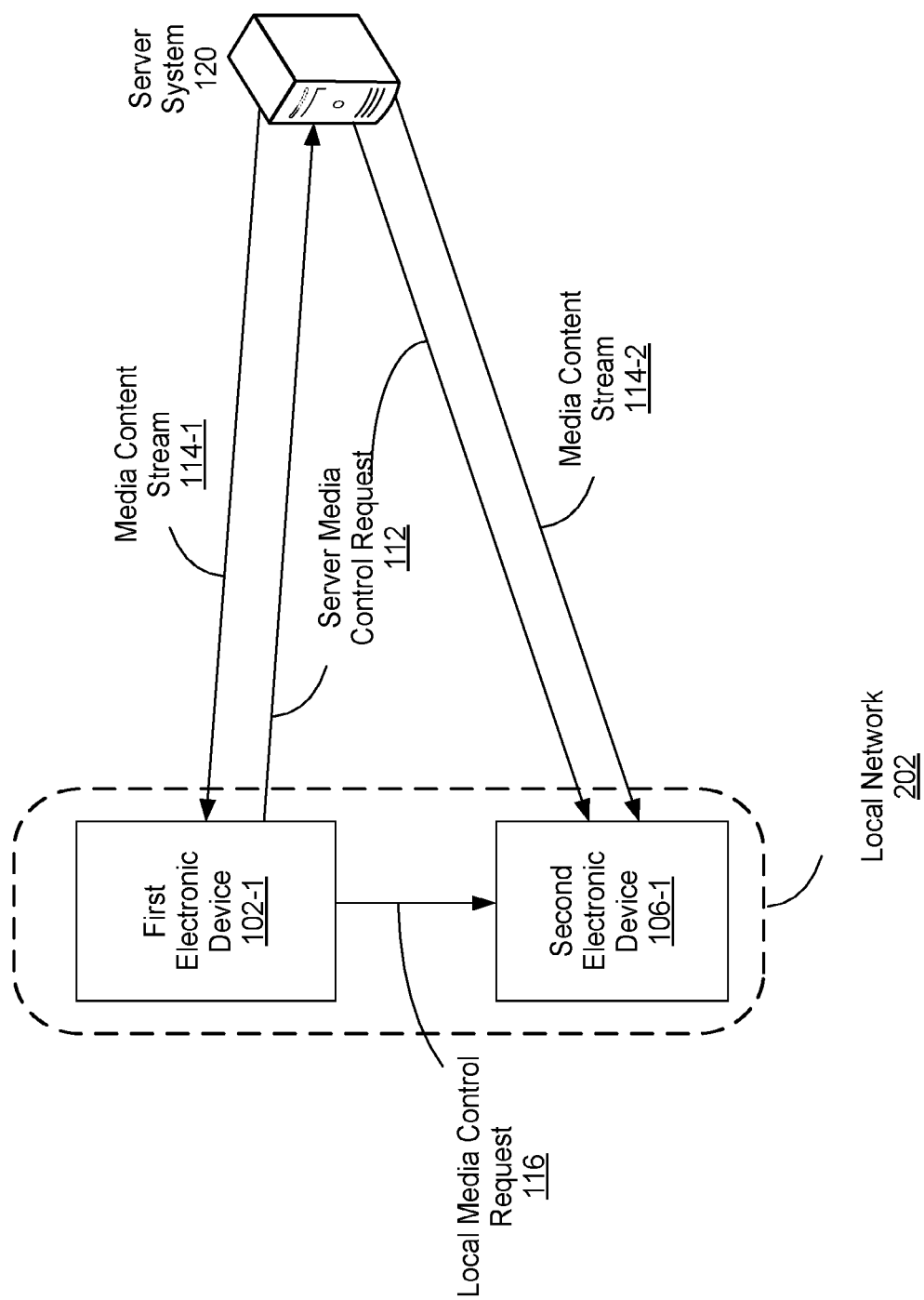
FIG. 2 is a block diagram illustrating a client-server environment in accordance with some implementations.

FIG. 2 is a block diagram illustrating a client-server environment 100 in accordance with some implementations. The client-server environment 100 includes a local network 202 that encompasses at least a first electronic device 102-1 and a second electronic device 106-1. Client-server environment 100 also includes a server system 120 that is located remotely from and is not integrated into the local network. In some implementations, the server system 120 stores media content and streams the stored media content to remote electronic devices upon request. In some implementations, the local network 202 is a Local Area Network, and the server system 120 is not within the IP address space of the Local Area Network. Thus, the server system 120 communicates with either the first or the second electronic devices (102-1, 106-1) via the Internet. For example, the media content streams 114-1, 114-2, and the server media control requests 112, discussed below, may be transmitted via the Internet.

In some implementations, a user of the first electronic device 102-1 uses an application running on the first electronic device 102-1 to send a server media control request 112 to the server system 120. In some implementations, the server media control request 112 includes information identifying a second electronic device to which the control request is addressed, as well as a payload that indicates what media control operation is to be performed by the second electronic device. As noted above, in some implementations, media control requests include requests to control aspects of the media that is being presented on the second electronic device 106-1, including but not limited to commands to initiate media presentation, cease media presentation, pause, skip, fast-forward, rewind, adjust volume, change the order of items in a playlist, add or remove items from a playlist, adjust audio equalizer settings, change or set user settings or preferences, provide information about the currently presented content (e.g., metadata), and the like.

In some implementations, in response to receiving the server media control request 112, the server system 120 forwards the server media control request 112 to the second electronic device 106-1. When received by the second electronic device 106-1, the server media control request 112 causes the second electronic device to initiate the media control operation indicated by the request. In some cases, this will include communicating with the server system 120 to perform any of the operations described above that may be requested by a media control request. In some cases, the second electronic device 106-1 will not need to establish any subsequent communication in response to receiving the server media control request 112, such as when the control request is for changing the volume, muting the speakers, changing equalizer settings, etc., as these operations can often be performed by the second electronic device 106-1 alone.

In some implementations, in response to receiving the server media control request 112, the server system 120 will perform an operation requested by the server media control request 112 without forwarding the request to the second electronic device 106-1. For example, if the server media control request 112 contains a request to initiate presentation of media content at the second electronic device 106-1, the server system 120 may simply begin sending the media content to the second electronic device 106-1 (e.g., via the media content stream 114) without also forwarding the server media control request 112 to the second electronic device 106-1. However, even where the server system 120 executes some types of media control operations upon receiving the request from the first electronic device 102-1 (and without forwarding the request to the second electronic device 106-1), the server system 120 still forwards some types of media control requests to the second electronic device 106-1. For example, a server media control request 112 that corresponds to a request to increase or decrease speaker volume, or any other request that can only be executed by the second electronic device 106-1, are forwarded to the second electronic device 106-1, even though requests to initiate presentation of media content may not be forwarded.

In some implementations, the first electronic device 102-1 also sends a local media control request 116 directly to the second electronic device 106-1 at substantially the same time that it sends the server media control request 112 to the server system 120. In some implementations, the local media control request 116 is configured to initiate the same media control operation as the server media control request 112.

In some implementations, the local media control request 116 is sent via the local network 202 (e.g., a Local Area Network, a Personal Area Network, a peer-to-peer connection, etc.). In implementations where the local network 202 is a Local Area Network that establishes IP address space behind a traffic routing device, the local media control request 116 is sent to the second electronic device 106-1 without sending the local media control request 116 to devices that are not within the IP address space of the Local Area Network, and/or without sending the local media control request 116 through a public domain name system. Sending a local media control request 116 to the second electronic device 106-1 over the Local Area Network, in addition to sending the server media control request 112 over the Internet to the server system 120, allows for two separate, redundant pathways for delivering the media control request to the second electronic device. This can allow the second device to react more quickly and more reliably to the media control request of the first electronic device 102-1. For example, if either connection path between the first and second electronic devices is not available, is improperly configured, or the like, the other connection path can ensure that remote-control functionality is still available. Moreover, this allows a service provider (e.g., a provider of software and/or devices that are configured to present media content) to provide a robust remote control solution that reduces the necessary technical knowledge of the end user, and is more likely to work in many different communication networks and environments (e.g., where a user's internal router is not configured for internal LAN communications, where an active Internet connection does not exist, etc.).

In some implementations, the server media control request 112 and the local media control request 116 are identical. For example, they may contain the same message, such as "Device{UserX/Home Stereo}; Operation{Play: UserX/Party Mix}." Upon receiving this message, each device may respond by performing a predefined set of operations. For example, in some implementations, the server system 120 begins streaming media content associated with User X's "Party Mix" playlist to User X's Home Stereo system. Similarly, the second electronic device 106-1 (here, the home stereo system), upon receiving the same message in the local media control request 116, sends a request to the server system 120 to initiate playback of the same media content. Because multiple control requests that are configured to initiate the same media control operation are sent from the first electronic device, some implementations provide systems and methods for handling duplicate or conflicting control requests, so that media control operations are not repeated, and to ensure that new and/or different media control requests are not ignored. Some examples of this are described below with reference to FIGS. 7-8.

In some implementations, the server system 120 performs the media control request without forwarding it to the second electronic device 106-1. In this case, executing the requested operation includes streaming media content associated with User X's "Party Mix" playlist to User X's Home Stereo system. In some implementations, the server system 120 forwards the message to the second electronic device 106-1. The forwarded message may be the identical message, or it may be modified or translated before it is forwarded to the second electronic device 106-1. In implementations where the message is forwarded, it may be forwarded instead of or in addition to the server system 120 executing the requested operation. Upon receipt of the forwarded message, the second electronic device 106-1 may then send a request to the server system 120 to initiate playback of the requested content.

In some implementations, the server system 120 may be configured to initiate a media control request (e.g., streaming media to the second electronic device 106-1) only if the request originates from the device at which the media is to be presented, and not if it originates from a different device. For example, in contrast to the example above where the server system 120 begins streaming media to the second electronic device 106-1 in response to a request from the first electronic device 102-1, the server system 120 instead would only begin streaming media to the second electronic device 106-1 if the request came directly from the second electronic device itself. In such implementations, the server 120 may be configured to forward all media control requests to the second electronic device 106-1 prior to executing them, as described above, so that the second electronic device 106-1 can determine whether, when, and how to execute the request. In some implementations, the second electronic device 106-1 (and/or the server system 120) determines the authenticity, trustworthiness, and/or origin of a media control request before it executes the request or initiates the operation.

In some implementations, the server media control request 112 and the local media control request 116 are not identical (e.g., the message is in a different form, or contains more, less, or different information), but are both configured to initiate the same media control operation by the second electronic device. For example, in some implementations, the server media control request 112 includes a command to begin delivering content to the second electronic device 106-1, while the local media control request 116 includes a command to cause the second electronic device 106-1 to issue a request to the server system 120. The request from the second electronic device 106-1 to the server system 120 in response to receiving one of the server media control request 112 and the local media control request 116 may be described as a third media control request (not shown). The form and content of the third media control request may be the same as or different from the server media control request 112 and the local media control request 116. In either case, the third media control request will be configured to cause the same media control operation as those requests. Accordingly, though these requests are configured to cause different processes to be performed by different devices (e.g., causing the server to begin streaming media to the second electronic device, or cause the second electronic device to request that media from the server), they ultimately cause the same ultimate media control operation to be initiated (e.g., presentation of the media by the second electronic device).

As noted above, in some implementations, a media control request is configured to switch the active media presentation device from one device (e.g., a user's mobile phone) to another (e.g., a user's home stereo system). In some implementations, this includes changing the device to which the server system 120 is streaming media content. For example, a user who is listening to a music playlist on a mobile phone can request that the music be played through a home stereo system instead of (or in addition to) the mobile phone. In some implementations, the request to change media presentation devices is initiated by a user (e.g., via a user interface on the mobile phone), and in some implementations the request is initiated automatically (e.g., based on the location of the mobile phone, the proximity of the mobile phone to the home stereo system, the time of day, the day of the week, and/or user identities).

FIG. 2 also illustrates how the destination of a media content stream can be changed from one device to another in a client-server environment. In some implementations, the first electronic device 102-1 is receiving a media content stream 114-1 from the server system 120. For example, the first electronic device 102-1 may be a mobile phone receiving streaming music from the server system 120. A device within the client-server environment 100 then requests that the media also, or instead, be presented by the second electronic device 106-1. This request may come from the first and/or the second electronic device (or any other device within the environment), and may be initiated by a user, or it may be initiated automatically. For example, the user may, upon returning home, request that the music that she is listening to on the mobile phone instead by presented by the second electronic device 106-1. In some implementations, the request to change the active presentation device is sent via the local and server media control requests 116, 112. Upon receiving and/or processing a request, the server system 120 begins sending the media control stream 114-2 to the second electronic device 106-1. The media content stream 114-1 that was being sent to the first electronic device 102-1 may continue or may be terminated, depending on factors such as an explicit user request, historical usage patterns, predefined preferences, etc. In some implementations, second electronic devices 106-*n* buffer/cache a portion of the same media stream that is being presented by the first electronic device 102-1, so that when the second electronic device 106-*n* is selected to begin presentation of the media content, the second electronic device 106-*n* begins presenting the media content seamlessly and without interruption. Buffering and/or caching of media content is discussed in greater detail below with reference to FIGS. 6A-6B.

In some implementations, as noted above, the context of the media content stream 114-1 is available to the second electronic device 106-1 once it begins receiving the media content stream 114-2. For example, information such as the current location within a playlist, recent play history, recent changes to a playlist, etc., are all available to the second electronic device 106-1, and may be viewed, used, modified, or otherwise operated on by a user through a user interface associated with the second electronic device 106-1. In some implementations, the context information is stored in the context database 126 of the server system 120.

Also, as noted above, in some implementations, the second electronic device 106-1 buffers/caches a portion of the content that is being streamed to the first electronic device 102-1, in case the user should choose to begin media presentation by the second device instead of or in addition to the first device. In some implementations, the second electronic device 106-1 caches/buffers a predetermined portion of the media content that is being streamed to the first electronic device 102-1, such as the next 10 seconds, 20 seconds, 30 seconds, 1 minute, etc. In some embodiments, the second electronic device 106-1 receives information about the current media playback location from the first electronic device 102-1 and/or the server system 120, such that when the second electronic device 106-1 receives a command to begin presenting the media content, it begins presentation at substantially the same position as the first electronic device 102-1.

In some implementations, the server system 120, the first electronic device 102-1, and the second electronic device 106-1 are configured to present media content regardless of the particular device on which the media content is stored. For example, as described above, media content can be stored at the server system 120 (e.g., in the media content database 124), and streamed to the first and/or the second electronic devices. However, media content may also be stored at the first and/or the second electronic devices (or other storage devices accessible to the first and/or second electronic devices, such as a NAS). This media content may be made accessible for presentation by any capable device associated with a user, even though the media content may not be available from the server system 120. For example, in some implementations, a playlist on a first electronic device (e.g., a user's mobile phone) may include media content that is stored on that device's own memory, as well as media content that must be streamed from a different source, such as a remote server (e.g., server system 120) or storage device within the local network 202 (e.g., a NAS). When the user plays back the playlist at the first electronic device, that device can switch between retrieving media content from its own memory and the different source, depending on where the media content item is stored. However, if the user wished to instead playback the playlist from a second electronic device (e.g., the user's home audio system), the second electronic device may not have the same media content stored in its memory as the first electronic device. Thus, in accordance with some implementations, media content that is stored on one device in the local network 202 (e.g., on first or second electronic devices 102-*n*, 106-*n* and/or on any device within a client environment 108-*n*, such as a NAS) may be streamed to another device within the local network 202 when its turn in the playlist arrives. Accordingly, the user need not worry about where any given media content item is stored, because the media may be streamed from either remote or local sources, or both.

In some implementations, music stored locally on the first electronic device is streamed to the second electronic device via local communication paths (e.g., within a Local Area Network) when that music is not available from a remote source associated with a media content provider (e.g., the server system 120). In some implementations, music stored on a first electronic device, but not available from the media content provider, is streamed to the server associated with the media content provider, and then streamed from the server associated with the media content provider to the second electronic device. Accordingly, media that is stored on one device may be accessible to another device seamlessly and without having to download, transfer, or otherwise duplicate the media content on multiple devices. Also, this process may be seamless to the user, such that the same controls and inputs are used both for causing a second device to stream media from a remote source, and for causing locally stored media to be streamed to the second device via local communication paths.

As described above, it would be beneficial to allow users to preview media content on an electronic device. This way, a user can listen to a portion of a media content item before deciding whether to purchase it or otherwise select it for presentation in its entirety. For example, users may wish to browse music choices in an electronic marketplace, and hear a snippet of a song that they come across in order to determine if they want to add it to a playlist or select it for immediate playback. Previewing media content can be a nuisance, though. If a user is already listening to a song, for example, and requests a preview of another song, playback of the first song may simply be terminated. Once the preview is over, then, the user may have to take additional steps to resume playback of the first song. For example, the user may have to navigate to a different area of a user interface, locate the song that was previously playing, and either restart the song from the beginning, or use trial-and-error to locate the point in the song where it was stopped. Accordingly, implementations discussed herein provide convenient previewing techniques to address these and/or other issues.

Moreover, modern media consumers access media on many different devices and use many different types of interfaces. For example, users browse and consume media on personal computers, laptops, mp3 players, portable media players, mobile phones, tablet computers, televisions, stereos, etc. These devices use various input devices and techniques, such as touch screens, pointing devices (e.g., computer mice or trackballs), touch-sensitive track-pads, keyboards, remote controls, and the like. Because of the differences between these various types of devices and user interfaces, various user interface techniques are also discussed below that provide convenient ways of initiating media content previews and other media controls.

While the following discussion frequently refers to previewing and/or presenting music, this is merely exemplary of any media content for which a preview may be presented, such as podcasts, audiobooks, radio (e.g., broadcast radio, Internet radio, etc.), video (e.g., movies, music videos, television programming, short-form video, etc.), and the like. It will be understood to one of ordinary skill in the art that other types of media content can be substituted in various aspects of the implementations described below. For example, a user may preview a video during playback of a song, or may preview a broadcast radio or television stream during playback of a locally stored podcast.

As noted above, it is inconvenient if a media content preview interrupts currently played media content and does not restart it when the preview finishes. Thus, a method is provided that allows a user to preview media content even when the user is consuming other media content, and restarts the other media content once the preview is complete. For example, a user may be listening to a song through a computer while also browsing other music on the computer, such as in an online music store or a media player. When the user finds a song, artist, or album that he would like to preview, he can select the content for preview using a preview button or another input technique. In response to the selection, the song that is currently playing can be paused, muted, or otherwise made less audible, while the content to be previewed is presented to the user. If the user was watching a video, the video can be dimmed, muted, lowered in volume, made translucent, paused, reduced in size, split-screened with the preview, or the like. Then, when the preview is over (e.g., because the user terminated the preview, or because a preview time expired), the original song or video is resumed. For example, if an originally played song was muted, or if the volume was otherwise lowered, the volume is returned to its previous level. If the original song was paused, it is un-paused. By resuming playback of the original song, the previewing experience is conveniently integrated into the overall listening experience, and the user is not burdened with additional navigation and selection tasks in order to return to his or her earlier content playback.

Furthermore, throughout the preview, any position and/or playback information of the originally playing media content can be maintained, such as the position in a song, the position in a playlist, a play history associated with the current playback session, etc. For example, if a user is listening to a playlist or album on a "shuffle" setting, the play history is maintained so that, when the original playback is resumed, songs are not replayed or re-ordered.

In some cases, a preview of media content should not interrupt presentation of currently playing media content by pausing, muting, or lowering the volume of the currently playing content. For example, if a user is presenting music via a home stereo system, he or she may want to preview other music to add to the current playlist without pausing or muting the music being played from the home stereo system. This situation may occur, for example, when the user is entertaining guests and wants to add music to a playlist without interrupting the current music. Thus, instead of muting, pausing, or otherwise interrupting the music, the preview may be presented to the user via a different device than the active presentation device, or via a subset of a group of active presentation devices (e.g., one speaker of a group speakers), or using a different audio output of the active presentation device. For example, if media content (e.g., a playlist) is being presented via a home audio system, a media preview may be presented to a user at a computer or mobile phone. In another example, if media content is being presented through one output means of a device (e.g., a charging port, data port, BLUETOOTH link, etc.), a preview can be presented through another output means (e.g., a headphone jack or a built-in speaker). In some implementations, a user manually selects a particular device for previewing media content and a particular device for presenting media content (e.g., regular playback). In some implementations, these and/or other features are automatically enabled when a user selects a "DJ" mode on a media content browsing device. In some implementations, the "DJ" mode causes media content from a playlist to be routed to one preselected device (or device output), and media content for presentation to be routed to a different preselected device (or device output).

Various ways of initiating a media content preview may also be provided. In some implementations, a user may select an affordance displayed on an electronic device in order to begin the preview. The affordance may be an icon, graphic, image, area, button (e.g., hardware button or touch-screen button), text, or any other control that can be selected by a user. For example, in some implementations, the affordance is an icon of a "play" button (or any other appropriate image, such as a thumbnail image of an album cover or movie poster), or the text "preview now" (or any other appropriate text). A user can select the affordance by clicking on the affordance with a cursor (e.g., via a mouse or touchpad interface), by touching on the area of a touch screen associated with the displayed affordance, hovering a cursor over the affordance, or the like.

Different inputs or interactions with a single affordance can cause different actions. In some implementations, when a user selects an affordance using one type of input or interaction, a preview of media content associated with that affordance is presented. If the user selects the affordance with a different type of input or interaction, however, other actions can be taken, such as adding the media content associated with the affordance to a current playlist, or terminating any currently played media content and presenting the selected media content instead.

In some implementations, an input representing a user selection of media content is detected (e.g., a touch contact or mouse click-down on a description of some media content), and different actions are taken depending on whether a change to the input is detected before or after expiration of a first time period. For example, if the change to the input is detected before expiration of the time period, the media content may be added to a playlist (e.g., as a next song, at the end of the playlist, or replacing a currently played song). If, on the other hand, no change to the input is detected before the expiration of the time period, the media content may be previewed. As described in serveral examples below, the input and the change to the input may be many different inputs and/or interactions. For example, the input may be a contact with a touch-sensitive surface, and the change to the input may be a liftoff from the touch-sensitive surface. In another example, the input may be a contact with a first area of a touch-sensitive surface, and the change to the first input may be a contact with a second area of the touch-sensitive surface. In this case, the contact with the first area may correspond to a user placing one finger on the touch-sensitive surface, and the contact with the second area may correspond to the user placing a second finger at a different point on the touch sensitive surface. In yet another example, an input can correspond to a "hover" input, where a cursor (e.g., controlled by a mouse, trackpad, etc.) is placed within a certain predefined area on a display. The predefined area may correspond to an icon, a graphic, text, or the like. A change to this input includes, for example, a mouse click or removal of the cursor from the predefined area. Other inputs and touch gestures may also act as the first input and/or the change to the first input, such as tap, pinch-together, pinch-apart, touch-and-hold, touch-and-release, click-and-hold, click-and-release, click-release, double-click, double-tap, sliding gestures, multi-touch gestures, drag-and-drop, slide-and-release, right mouse click, selection of menu items (e.g., stop, pause, play now, play next, add to queue, increase/decrease volume, etc.), and the like.

In some implementations, a "touch-and-hold" or a "click-and-hold" input (also referred to as a maintained input) initiates a preview of the selected media content, while a "touch-and-release" or "click-and-release" input (also referred to as a momentary input) adds the selected media content to a current playlist. In this case, an initial contact on a touch screen (or mouse click-down) corresponds to the input, and a liftoff from the touch screen (or a mouse click-release) corresponds to the change to the input.

In some implementations, where a maintained input is used to initiate a media content preview, the selected media content is previewed (e.g., played back) for as long as the input is maintained. For example, in a touch-screen environment, after it is determined that a contact with the touch screen corresponds to a maintained input (i.e., no liftoff has been detected for a certain time period), the media content is previewed until the contact is removed (i.e., when the liftoff is finally detected). In some implementations, the selected media content is previewed for a shorter or longer time than the duration of the maintained input. For example, in some implementations, the maintained input begins a preview clip of a predetermined length (e.g., 5, 10, 15, 20 seconds, etc.). In some implementations, the preview will continue beyond the point when the user ends the maintained input, such as to provide an audio/video fade-out or other transition, or until the full preview clip is over. In some implementations, the preview will end at the earlier of (i) the expiration of a time period (e.g., the preview clip length) or (ii) the end of the maintained input. Thus, once a user provides a maintained input, the preview will be presented until the user releases the maintained input or until the preview clip is over. In some implementations, a preview is only limited by the length of the actual media content, so it is possible to preview an entire song, album, playlist, or other media content.

In some implementations, in order to determine whether an input corresponds to a maintained input or a momentary input, a timer is started when a contact or click-down input is detected. If a liftoff or click-release event is detected before the timer expires, the input corresponds to a momentary input. If a liftoff or click-release event is not detected before the time expires, the input corresponds to a maintained input. In this case, the expiration of the timer (possibly in conjunction with additional signals or logic) initiates the media content preview. In some implementations, a liftoff or click-release event that occurs after the time expires causes the preview to end.

In some implementations, other actions can be taken in response to detecting changes to the input. For example, in some implementations, once an input initiates a preview, a change to the input—such as moving a cursor with a mouse, or making a "swipe" gesture on a touch screen—changes a playback attribute of the preview (or causes other appropriate actions). Here too, the change to the input may include various interactions and gestures, such as pinch-together, pinch-apart, touch-and-hold, touch-and-release, click-and-hold, click-and-release, click-release, double-click, sliding gestures, multi-touch gestures, etc. In some implementations, the change to the input causes the preview to skip forward or backward within a song, a playlist (e.g., including an album, a user generated playlist, a series of podcasts, etc), or any other media content or collection of media content items.

In some implementations, the change to the input includes a directional component, such as a "swipe" gesture on a touch screen, and actions can be taken based on the particular direction of the input. For example, in some implementations, a user first initiates a preview by touching and holding an area of the touch screen with a finger. The user can then slide his finger forward to skip to a next track in the playlist, or slide his finger backwards to skip to a previous track in the playlist. In some implementations, the actions taken (e.g., skipping tracks, fast-forwarding within a track) are triggered if the input has a sufficient directional component in a certain direction. Various techniques can be used to determine the directional components of a swipe input. In some implementations, a swipe input path with a length, direction, and/or angle (e.g., as measured from the point of initial contact) that falls within a particular range may trigger the action. In some implementations, a swipe input in a right-hand direction (e.g., substantially horizontal and from left to right) causes a first action, and a swipe input in a left-hand direction (e.g., substantially horizontal and from right to left) causes a second action. In some implementations, a swipe input in a down direction (e.g., substantially vertical and from top to bottom) causes a first action, and a swipe input in an up direction (e.g., substantially vertical and from bottom to top) causes a second action. In some implementations, the first and second actions are a skip forward action and a skip back action, respectively.

In some implementations, other directional inputs or gestures cause these or other actions. For example, a first contact corresponding to maintained input (i.e., a "touch-and-hold" input on a touch screen) may cause a preview to begin, and a second contact may cause the preview to skip forward to a next or previous track, or fast-forward or rewind the preview. The second contact may be a maintained input or a momentary input. In some implementations, a second contact corresponding to a maintained input will cause the preview to fast-forward for as long as the maintained input is held. Other directional inputs or gestures that may be used in the above implementations include, but are not limited to, diagonal swipes, loops, curves, multi-touch inputs, tap sequences, and other complex touch paths.

Figure 13:
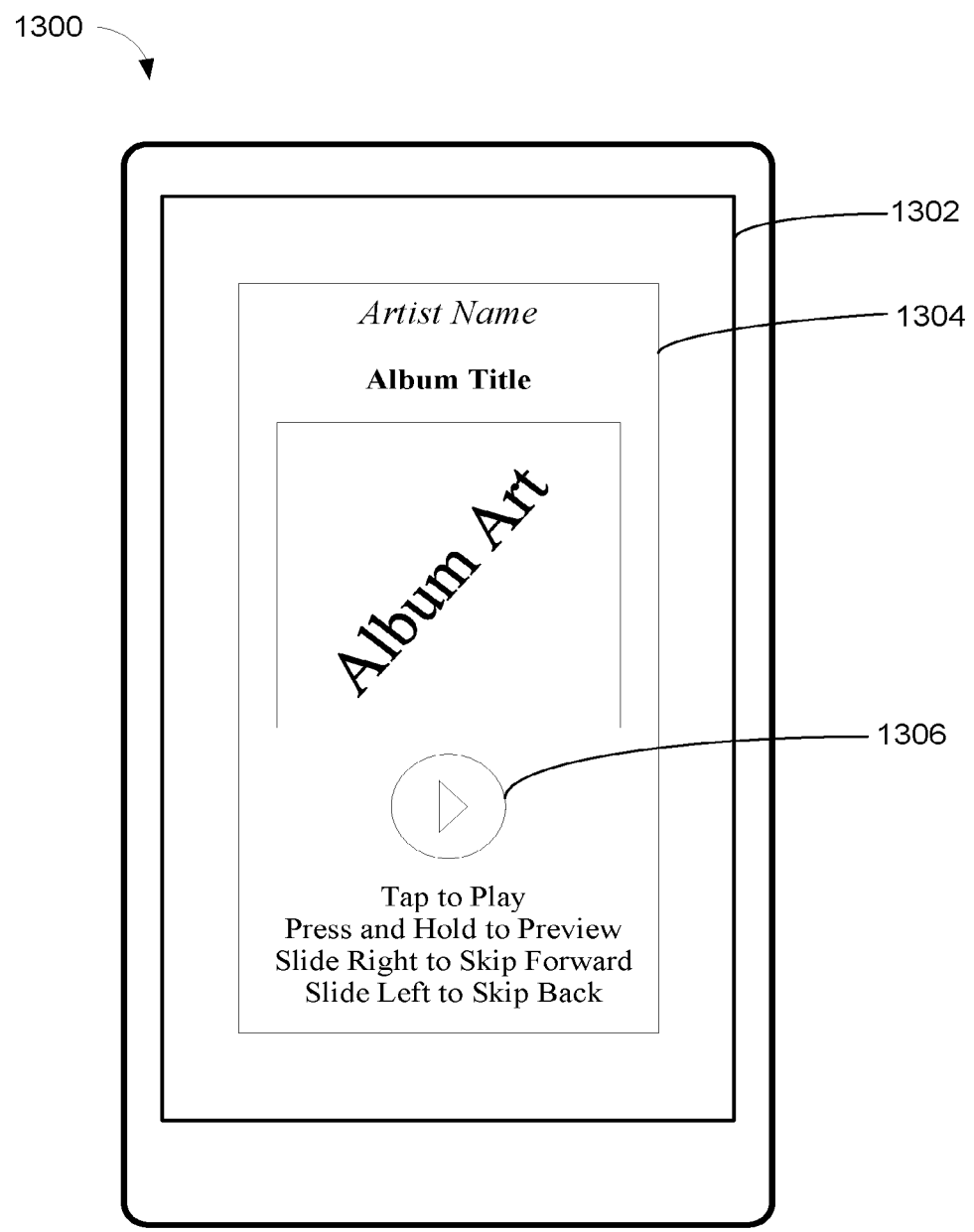
FIG. 13 is a diagram illustrating an exemplary electronic device and user interface, according to some implementations.

FIG. 13 illustrates an exemplary device 1300 showing a part of a user interface, in accordance with some implementations. The device 1300 includes a display area 1302. In some implementations, the device is a mobile phone, mobile audio player, or the like. A media preview area 1304 is displayed on the display 1302, and can include any appropriate information. As shown, the media preview area 1304 includes an artist name, album title, album art, and a preview button 1306. As described above, the preview button 1306 is configured, in some implementations, so that a tap input (e.g., a momentary input) causes the album and/or individual songs on the album to be presented by adding it to a playlist. Alternatively, if the preview button 1306 is pressed and held (e.g., a maintained input), one or more tracks from the album are previewed as long as the input is maintained.

As noted above, in some implementations, media content can be previewed in response to a cursor being "hovered" over a particular area of a display screen. For example, a media browsing environment presented in a web page or media player application may include multiple graphical items (also referred to as "tiles") corresponding to media content, such as albums, playlists, songs, audiobooks, movies, videos, and the like. In some implementations, the tiles include depictions of album art, media content metadata (e.g., album title, track listings, authors, actor names, artist names, artist photos, etc.), and the like. The tile may also include a "preview" area that, when selected, causes a preview of the media content to be presented. In some implementations, the preview area corresponds to an icon, graphic, text, picture, or other discernible area within or associated with the tile. In some implementations, when the user hovers over this area with a cursor, a preview of the media content associated with the tile is initiated. In some implementations, the preview is initiated once the user has hovered over the area for a length of time, such as 0.5 seconds, 1 second, 2 seconds, or any other appropriate duration. In some implementations, the preview continues until the user removes the cursor from the area (e.g., until the cursor is no longer within the area defined by the icon).

In some implementations, once the preview has been initiated, it continues until the user removes the cursor from a second, larger area. In some implementations, the second area corresponds to a tile, as described above. Once the preview is initiated, then, the user can remove the cursor from the preview area (e.g., a preview icon) and the preview will continue until the cursor is removed from the larger tile area. In some implementations, the second area (e.g., the tile) is contiguous with the first area (e.g., the preview icon). For example, a preview icon may be displayed at least partially within a tile, graphically connected to the tile (e.g., having at least a single common border), or fully within (i.e., completely surrounded by) a tile.

In some implementations, when the preview is initiated, additional control elements are displayed to the user. For example, in some implementations, once a user hovers over a preview icon for a sufficient time, the preview starts and one or more playback controls appear with which the user can control the preview. The playback controls may include controls (e.g., icons, graphics, etc.) to skip forward, skip backward, fast forward, rewind, pause, stop, add media content to a playlist, jump to specific track (e.g., track numbers), play now, play next, etc. The controls may be selected in any appropriate way, such as by hovering over the control (e.g., moving the cursor from the preview icon to the control icon), or clicking on the control (e.g., left- or right-clicking). In some implementations, where the media content to be previewed includes multiple media content items, such as where the media content is an album or a playlist, the controls allow the user to skip between the individual content items during the preview. In some implementations, the controls display numbers associated with individual tracks of an album, and selecting a number (e.g., by hovering over the number or clicking on the number) initiates a preview of that particular album track.

Figure 14:
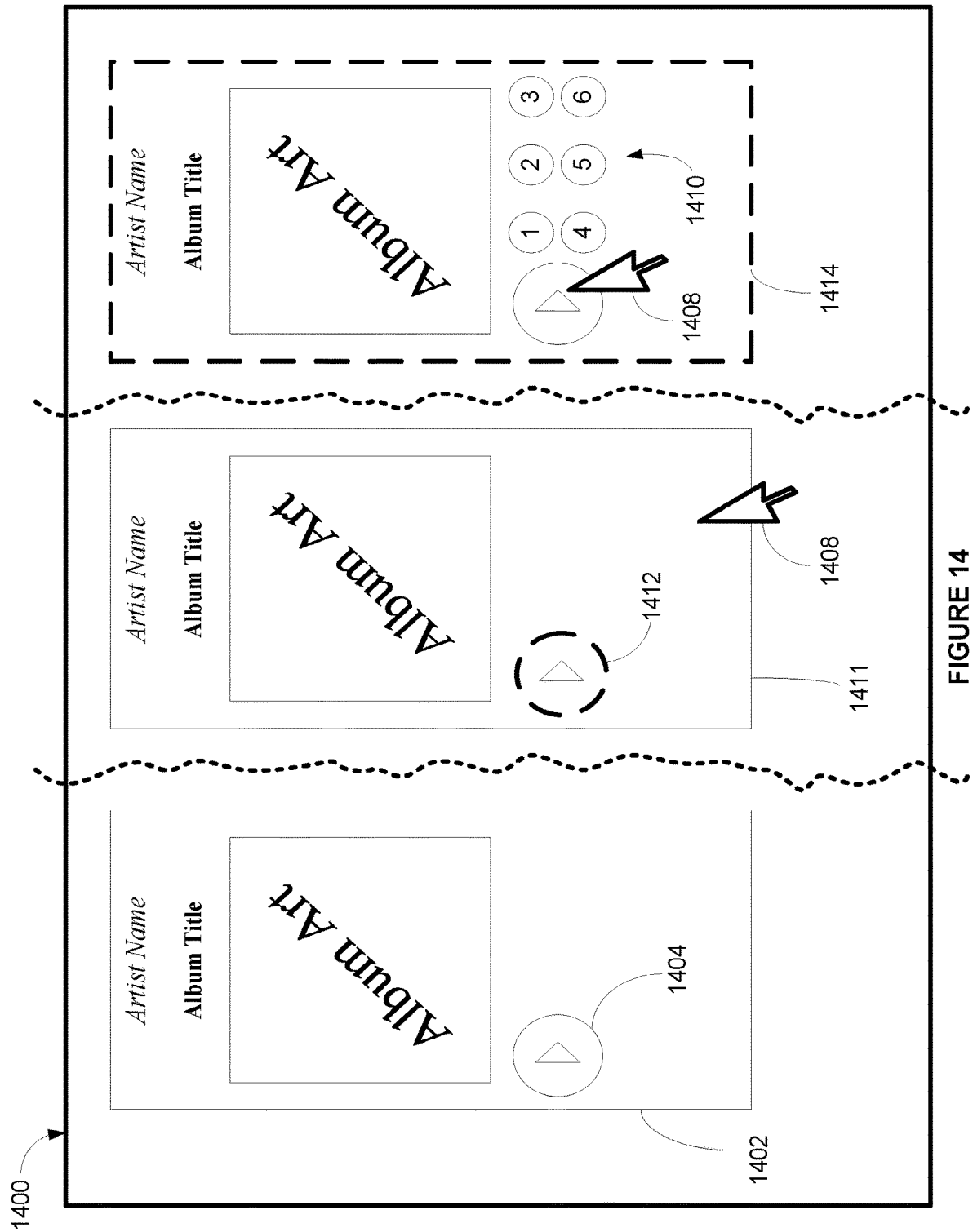
FIG. 14 is a diagram illustrating another exemplary user interface, according to some implementations.

FIG. 14 illustrates an exemplary user interface 1400, in accordance with some implementations. The user interface 1400 is divided into three sections with dotted lines. The segments may be understood as depicting a portion of the user interface at different times during a user interaction. The user interface 1400 includes tiles, such as tile 1402 in the left-most segment of the user interface 1400. The tiles include information about media content, including artist name, album title, and album art. The tiles include a preview icon, such as preview icon 1404 in the left-most segment of the user interface 1400. As described above, preview icons may define or be associated with areas that, when a cursor is detected therein, cause a preview of the media content associated with the tile to begin.

The middle segment of the user interface 1400 illustrates a tile 1411 with a preview icon 1412 before any preview associated with this tile has been activated. The outline of the preview icon 1412 is shown in dashed lines to illustrate the area of the display that is "active" such that if the cursor 1408 is detected within that area, a preview associated with that tile will be presented. The dashed line border of the preview icon 1412 is provided here for illustrative purposes; borders or other graphical features or elements of a preview icon may or may not change during an interaction with a user. (In some implementations, the border of a preview icon and/or a media information tile flashes, moves, is made bold, is animated, changes color, changes brightness, or otherwise changes to grab the user's attention and, in some implementations, indicate that an interaction with the border will cause the device to take some action.) The right-most segment of the user interface 1400 illustrates a tile 1414 after a preview has been initiated in response to detecting the cursor 1408 within the area of the preview icon. The outline of the tile 1414 is shown in dashed lines to illustrate the area of the display that is "active" such that if the cursor 1408 is detected outside that area, the preview that was initiated by detecting the cursor 1408 within the preview icon will cease. Also, the right-most segment includes media control icons 1410 that were displayed in response to detecting the cursor 1408 within the preview icon. In this example, the media control icons 1410 correspond to track numbers of the album associated with the tile 1414. Because the "active" region has been expanded to the border of the tile 1414, the preview will continue even if the user moves the cursor 1408 around within the area of the tile 1414. Thus, the user may move the cursor 1408 to the media control icons to select different tracks to preview, e.g., by clicking on or hovering over them. Other types of controls may also be provided instead of or in addition to the track numbers shown in FIG. 14. For example, as described above, the media control icons may include fast forward, rewind, skip, play, pause, add to playlist, play next, and the like.

When a user is browsing or is otherwise presented with media content that can be previewed, it is also beneficial to ensure that the media content can be presented to the user quickly and without delays. Thus, portions of media content that may be previewed by a user can be pre-fetched (e.g., downloaded and buffered/cached) so as to reduce or minimize the delay between the selection of the preview and the presentation of the media content. In some implementations, previews of media content are initiated by a user selection of a control that is displayed to the user. A control, such as a button, icon, graphic, text, etc., can be displayed, for example, in a web page (e.g., a web page associated with a social networking service, such as FACEBOOK), or in a media player/browser application. Moreover, controls may be displayed on any type of device, such as a computer (e.g., laptop, desktop, tablet), mobile phone, etc.

In some implementations, media content for a preview is pre-fetched when a control associated with a media content preview is displayed to a user. Accordingly, at least a portion of each media content that could be previewed at a given time—as determined by those controls that are displayed to the user and hence are selectable by the user—is downloaded and buffered/cached so that it can be presented to the user without undue delays if selected. (Where previewable media content includes several individual media content items, such as when the media content is an album or a playlist, pre-fetching a portion of the album can include pre-fetching a part of each track or a subset of tracks of the media content.) In some implementations, when a control ceases to be displayed to the user, then, the pre-fetched media content associated with that control can be deleted or marked for deletion.

In the various implementations described above, the various inputs, outputs, and actions described may be performed by one device or combinations of devices. For example, a user may browse media content and select media content for preview on a first electronic device 102-1 (e.g., a laptop computer), and use a second electronic device 106-1 (e.g., a home stereo system) to present the preview or other media content. Or, a user may browse and select media content on one device and also preview the media content on that same device (e.g., a first electronic device 102-1).

In implementations where media content is pre-fetched, the media content can be downloaded and/or cached to the device that will present the media content (e.g., the second electronic device 106-1), even if the control that triggers the pre-fetching is displayed at a different device (e.g., the first electronic device 102-1). For example, if a user is browsing media content on a mobile phone while listening to other media content via a home audio system, media content can be downloaded by the home audio system in response to a control being displayed on the mobile phone. In some implementations, the browsing device and the presentation device are in communication with each other so that the browsing device can cause the presentation device to pre-fetch media content associated with controls that are displayed on the browsing device at that time. For example, if a user is presented with a control in a web page or an application on a mobile phone that would allow him to preview the song "American Pie" by Don McLean, the mobile phone can send a request to the home audio system to download a portion of "American Pie." In some implementations, the mobile phone sends a request to a remote server (discussed below), and the server causes the home audio system to download the portion of the song.

In some implementations, the browsing device and the playback device are the same device. When the device detects that a control for initiating a preview is displayed, it can request (or receive without issuing a request) a portion of the media content to be presented if the user selects the control.

A remote server (e.g., server system 120, FIG. 1) can determine when a control for initiating a preview of media content is displayed to a user, and send or otherwise enable access to the media content in response. For example, in some implementations, the remote server itself causes the control to be displayed to the user (e.g., by serving a web page or content for a web page to the user). When the remote server detects that the control is sent to the user's device or otherwise displayed to the user, the server can also download a portion of the media content to a device in case the user should initiate presentation of the media content. The device to which the portion of the media content is downloaded depends on several factors. For example, it may be downloaded to a device that is currently presenting other media content to the user. Or, if no device is currently presenting other media content to the user, it may be downloaded to the browsing device. Or it may be downloaded to a device that the user most frequently or most recently used to present media content.

In some implementations, the preview control itself is configured to initiate the pre-fetching when it is displayed. For example, a "preview" button in a web page may be configured to cause a download request (e.g., an HTTP request) to be sent to the remote server when the button is displayed in a web browser (or other application). In some implementations, the download request includes a user or account identifier that associates the download request with a particular user or a particular set of devices. In some implementations, the download request is sent to the same server that delivers media content to a user's presentation device (or a server that is associated with the service that delivers media content). Thus, when a download request is received from a user who is already receiving media from the content provider, the server system (or, more generally, a content provider) can deliver the portion of the media content to the same device that that is currently presenting media content. Then, if the user selects the control to initiate presentation of the new media content (e.g., to preview it), the presentation device can simply begin presenting the pre-fetched portion of the content.

Various techniques for providing media controls to a user are discussed in commonly owned U.S. application Ser. No. 13/443,781, entitled "Systems and Methods for Controlling a Local Application Through a Web Page," which is hereby incorporated by reference in its entirety.

In some implementations, media content is provided by a remote server (e.g., server system 120). The remote server may be associated with a content provider that provides access to media content such as music, movies, podcasts, audiobooks, etc. In some implementations, the remote server communicates with browsing devices (e.g., mobile phones, computers, or any device on which a user may browse media content and select media content for presentation and/or preview) and with presentation devices (e.g., televisions, home audio systems, computers, mobile phones, or any device that can present media content). Browsing devices, presentation devices, and remote servers, communicate by any appropriate communication standards, protocols, or technologies, such as Internet Protocol (e.g., including Transmission Control Protocol, User Datagram Protocol, Internet Control Message Protocol, Hypertext Transfer Protocol, etc.), BLUETOOTH, Wired Ethernet (e.g., IEEE 802.3), Wireless Fidelity (Wi-Fi) (e.g., IEEE 802.11a, IEEE 802.11b, IEEE 802.11g, and/or IEEE 802.11n), or any other suitable communication protocol, including communication protocols not yet developed as of the filing date of this document.

Various implementations described above may also be advantageously used to facilitate previewing of individual songs or tracks that are sampled in a currently played song. For example, some songs include small portions of other songs mixed in to create a composite work. This and/or similar techniques are known as "sampling." In some implementations, a preview control can be displayed to a user when a currently presented song includes samples of other songs. When selected, the preview control initiates a preview of the song (or songs) that are sampled in the currently presented song. The preview control may be presented to the user on any appropriate device, such as a first electronic device 102-1, or a second electronic device 106-1.

For example, if the user is listening to the song "Come with Me" by Sean Combs (which includes a sample of the Led Zeppelin song "Kashmir"), a user may be presented with a preview control (e.g., a button or icon, as described above). When selected, the original Led Zeppelin version of the song "Kashmir" is then presented to the user. In some implementations, the various techniques described above for selecting a media content preview, seamlessly integrating the preview into currently presented media, and pre-fetching media content are used in this technique as well.

In some implementations, the songs that are sampled in a currently played song are identified using a service or a lookup table that identifies the songs that are sampled in other songs. For example, a server system associated with a media content provider (e.g., server system 120) may access a lookup table to determine if a song that is being presented to a user contains any samples of other songs. If so, original versions of the sampled songs may be made available for preview by the user. The lookup table may be stored and/or maintained by the content provider, or by a third party.

Figure 3:
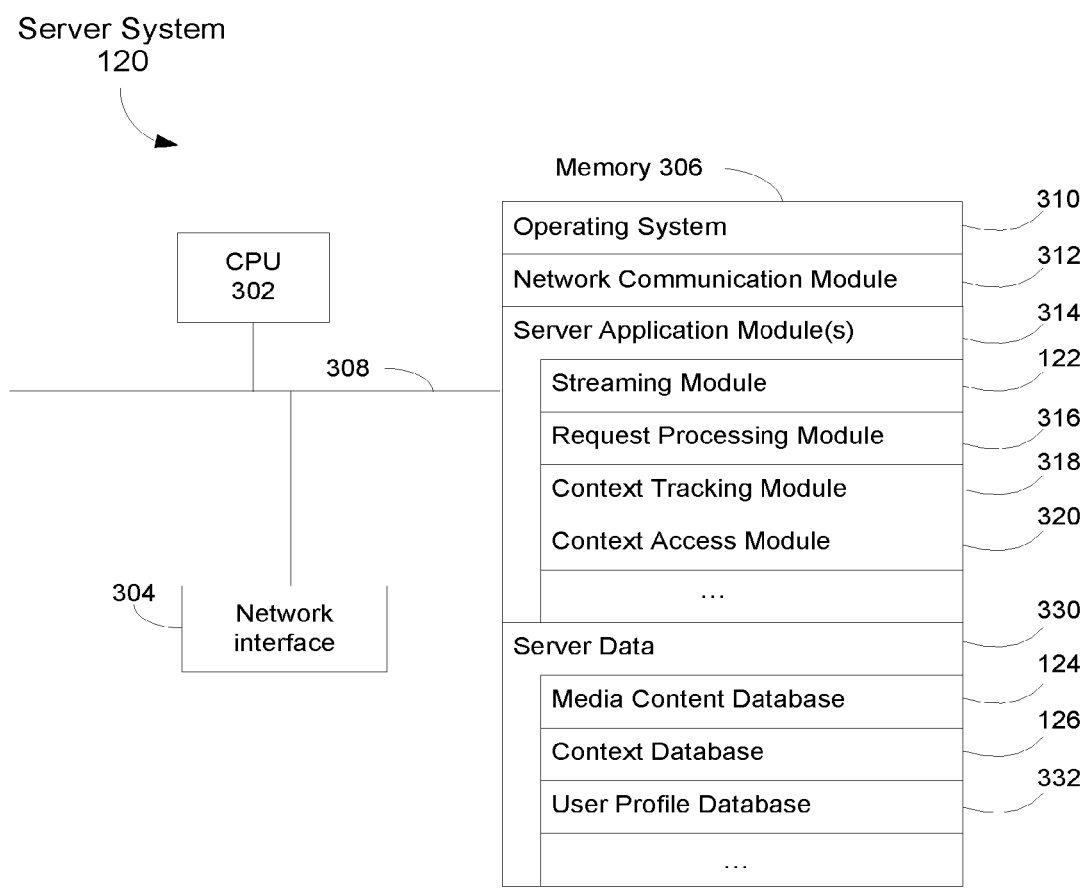
FIG. 3 is a block diagram illustrating a server system in accordance with some implementations.

FIG. 3 is a block diagram illustrating a server system 120, in accordance with some implementations. The server system 120 typically includes one or more processing units (CPUs) 302, one or more network interfaces 304, memory 306, and one or more communication buses 308 for interconnecting these components.

Memory 306 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternately the non-volatile memory device(s) within memory 306, includes a non-transitory computer readable storage medium. In some implementations, memory 306 or the computer readable storage medium of memory 306 stores the following programs, modules and data structures, or a subset thereof:

an operating system 310 that includes procedures for handling various basic system services and for performing hardware dependent tasks;

a network communication module 312 that is used for connecting the server system 120 to other computers via the one or more communication network interfaces 304 (wired or wireless) and one or more communication networks, such as the Internet, other Wide Area Networks, Local Area Networks, Personal Area Networks, metropolitan area networks, VPNs, and so on;

one or more server application module(s) 314 for enabling the server system 120 to perform the functions offered by the server system 120, including but not limited to:

a streaming module 122 for streaming media content to an electronic device (e.g., first and second electronic devices 102-n, 106-n, FIG. 1) remote from the server system 120;

a request processing module 316 for receiving requests from electronic devices (e.g., first and/or second electronic devices 102-n, 106-n, FIG. 1), wherein the requests include requests to stream specific media content to the electronic devices and/or requests to change the destination of the media content stream (e.g., media content stream 114, FIG. 2) from a first electronic device to a second electronic device;

a context tracking module 318 for tracking and storing the context of a media content stream (e.g., media content streams 114-1, 114-2, FIG. 2), including storing, among other data, the current playback position in a media content stream that is currently being presented by an electronic device (e.g., first and/or second electronic devices 102-n, 106-n, FIG. 1), the position in a current playlist, the play history of a user, the preferences of a user, previously skipped media content, whether media content items were "liked" or "disliked" (e.g., via "starred," "thumbs-up," and/or "thumbs-down" indications), and the like;

a context access module 320 for allowing electronic devices (e.g., first and/or second electronic devices 102-n, 106-n, FIG. 1) associated with a given user account to access the current context for media content streams associated with the given user account; and one or more server data module(s) 330 for storing data related to the data server system 120, including but not limited to:

media content database 124 including a library of media content;

a context database 126 including information associated with one or more media content streams (e.g., media content streams 114-1, 114-2, FIG. 2), wherein context information includes the current playback position in a media content stream, metadata relating to the media, a position in a playlist, play history of a user, user preferences, skipped media, and user settings; and a user profile database 332 including account information for a plurality of users, each account including user media histories, user preferences, and determined user interests.

Figure 4:
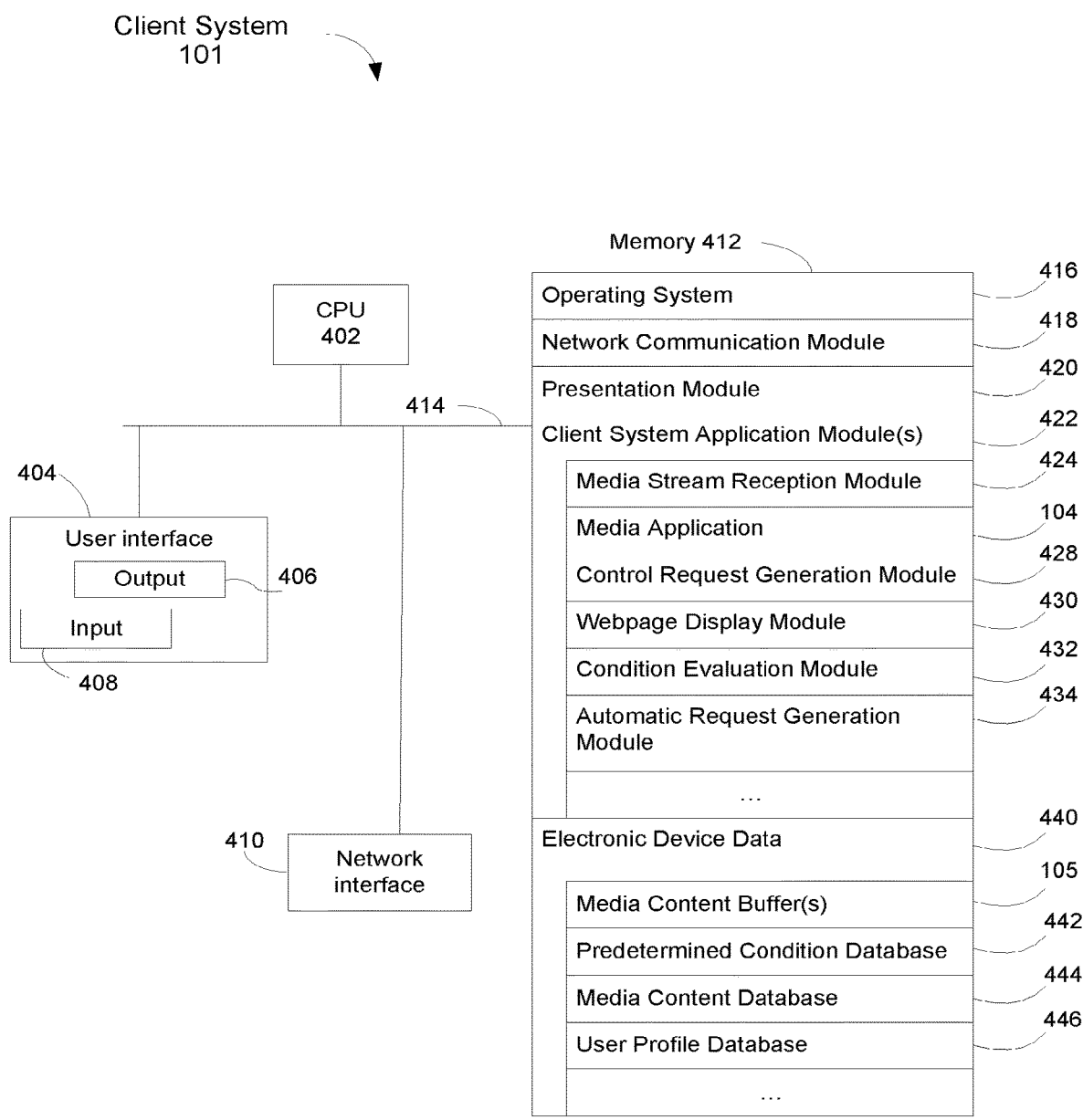
FIG. 4 is a block diagram illustrating an electronic device in accordance with some implementations.
Figure 5:
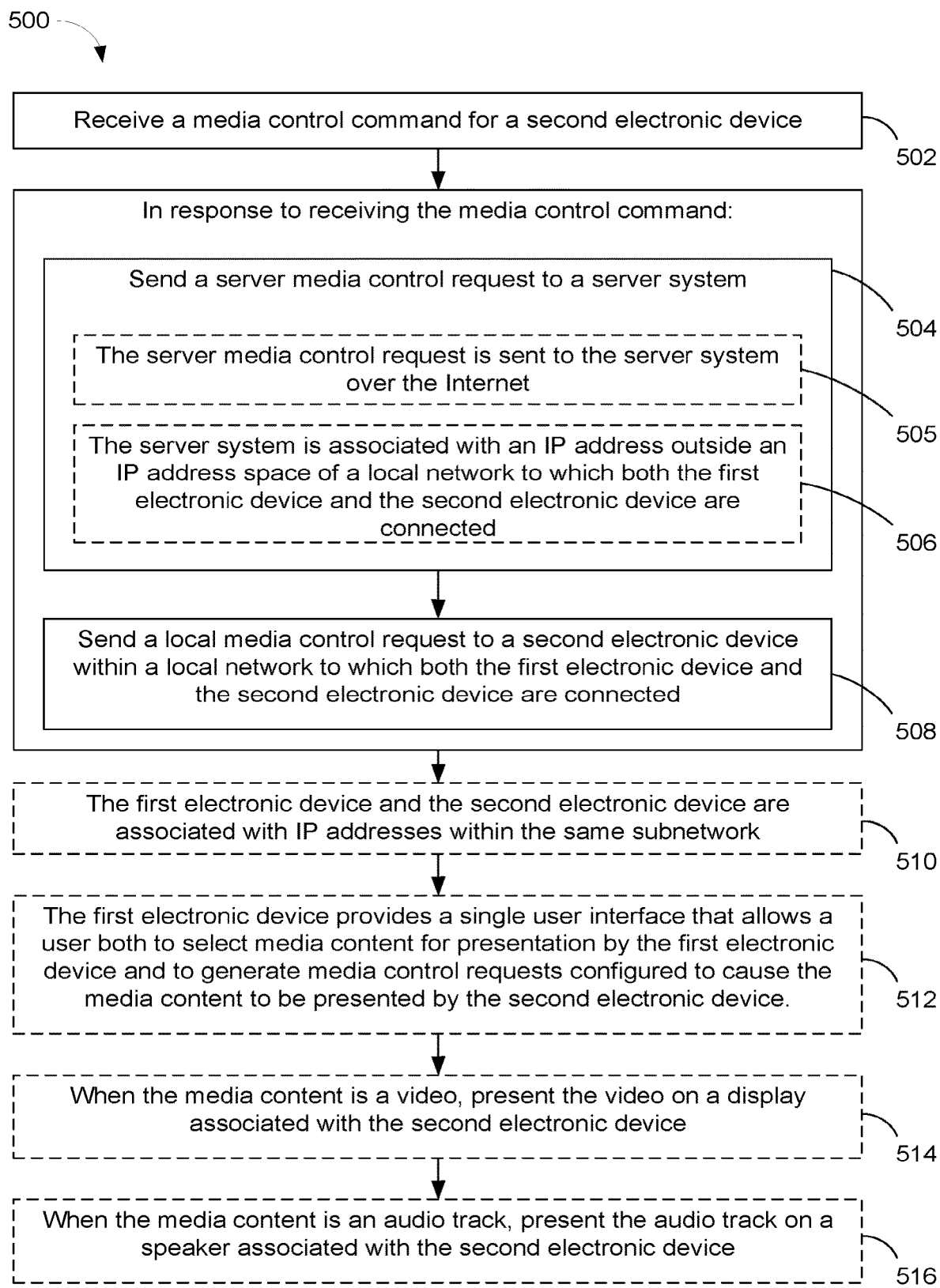
FIG. 5 is a flow diagram illustrating a method of controlling media presentation, performed by a first electronic device, in accordance with some implementations.

FIG. 4 is a block diagram illustrating a client system 101, in accordance with some implementations. In some implementations, the client system 101 represents first electronic devices 102-n and/or second electronic devices 106-n. The client system 101 typically includes one or more processing units (CPUs) 402, one or more network interfaces 410, memory 412, and one or more communication buses 414 for interconnecting these components. The client system 101 includes a user interface 404. The user interface 404 includes user interface elements that enable output 406 to be presented to a user, including via speakers or a visual display. The user interface 404 includes user interface components that facilitate user input 408 such as a keyboard, a mouse, a voice-command input unit, a touch sensitive display, or other input buttons 408. In some implementations, the client system 101 is a wireless device, such as a mobile phone. Furthermore, some client systems 101 use a microphone and voice recognition to supplement or replace the keyboard.

Memory 412 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 412 may optionally include one or more storage devices remotely located from the CPU(s) 402. Memory 412, or alternately the non-volatile memory device(s) within memory 412, includes a non-transitory computer readable storage medium. In some implementations, memory 412 or the computer readable storage medium of memory 412 stores the following programs, modules and data structures, or a subset thereof:

- an operating system 416 that includes procedures for handling various basic system services and for performing hardware dependent tasks;
- a network communication module 418 that is used for connecting the client system 101 to other computers via the one or more communication network interfaces 410 (wired or wireless) and one or more communication networks, such as the Internet, other Wide Area Networks, Local Area Networks, Personal Area Networks, metropolitan area networks, VPNs, local peer-to-peer and/or ad-hoc connections, and so on;
- a presentation module 420 for enabling presentation of media content at the client system 101 through the output mechanisms 406 associated with the user interface 404 (e.g., screens, speakers, headphones, etc.);
- one or more client system applications module(s) 422 for enabling the client system 101 to perform the functions offered by the client system 101, the application module(s) 422 including but not limited to:
  - a media stream reception module 424 for receiving (and, in some implementations, transcoding) a media content stream (e.g., media content stream 114-n, FIG. 2) from a server system (e.g., server system 120, FIG. 2), the media content stream including data needed to present media content at the client system 101 and context data for the media content stream, wherein the media content stream can include a variety of media types including, but not limited to, audio media such as music, radio, audio books, and podcasts, video media such as internet videos, television programming, movies, digital photographs, and any other type of digitally transmissible media (e.g., games, images, advertisements, etc.);
  - a media presentation and control application 104 for presenting media content by the client system 101, for controlling media presentation by other electronic devices, and for interacting with the server system 120;
  - a control request generation module 428 for, in response to user input, generating a server media control request for transmission to the server system (e.g., server media control request 112, FIG. 2) and a local media control request for transmission to the second electronic device (e.g., local media control request 116, FIG. 2) via a Local Area Network, VPN, BLUETOOTH, peer-to-peer, etc.;
  - a webpage display module 430 (including, e.g., a web browser) for displaying a webpage published by a third party;
  - a condition evaluation module 432 for determining whether a predetermined condition is met; in some implementations, the condition evaluation module 432 periodically determines whether any predetermined condition has been met; and
  - an automatic request generation module 434 for, in response to a determination by the condition evaluation module 432 that a predetermined condition is met, generating a request for transmission to the server system without any direct user input;
- an electronic device data module 440 for storing data, including but not limited to:
  - media content buffer(s) 105 including media content data received from a stream from the server system (e.g., server system 120, FIG. 2) and stored in the memory of the client system 101 until it is presented by the client system 101;
  - predetermined condition database 442 including, but not limited to, one or more predetermined conditions, established by the user of the client system 101, that determine whether a media control request to change the destination of the media content stream (e.g., media content stream 114-1, FIG. 2) from the server system should be automatically generated;
  - media content database 444 for storing, on the local device, media content that is part of the user's personal library of media content; and
  - a user profile database 446 including account information for a specific user of the client system 101 including user media history, user preferences, determined user interests, and account credentials.

FIGS. 5-8 are flow diagrams illustrating a process of controlling media presentation at an electronic device, in accordance with some implementations. Each of the operations shown in FIGS. 5-8 may correspond to instructions stored in a computer memory or computer readable storage medium. Optional operations are indicated by dashed lines (e.g., boxes with dashed-line borders).

In some implementations, the first electronic device corresponds to the first electronic device 102-1, discussed above (also described with respect to FIG. 4). A media control command for a second electronic device is received (502). In some implementations, the media control command corresponds to a user input. In some implementations, the user input is received via user interface 404 of the first electronic device 102-1. For example, the user may select a song for playback by pressing a representation of the song (e.g., an icon, title, etc.) on a touchscreen of a mobile phone. In some implementations, the first electronic device is selected from the group consisting of: a computer, a mobile phone, a remote control device, a portable media player, and the like. In some implementations, the second electronic device is selected from the group consisting of: a television, a home media receiver/player, a computer, a home audio/visual system, a speaker, and the like. In some implementations, any of the identified devices, and other devices not explicitly listed, may be a first electronic device or a second electronic device.

In response to receiving the media control command, a server media control request is sent to a server system (504). In some implementations, the server system corresponds to the server system 120, discussed above. In some implementations, the server media control request is sent to the server system over the Internet (505). In some implementations, the server system is associated with an IP address outside an IP address space of a local network to which both the first electronic device and the second electronic device are connected (506).

Also in response to receiving the media control command, a local media control request is sent to a second electronic device within a local network to which both the first electronic device and the second electronic device are connected (508). In some implementations, the local network is a Local Area Network, as discussed above. In some implementations, the first electronic device and the second electronic device are associated with IP addresses within the same subnetwork (510). The local media control request is sent over any communication type that allows communication between the two electronic devices without having to leave the local network. In some implementations, the local media control request is sent via Wi-Fi, BLUETOOTH, or the like.

In some implementations, the server and the local media control requests are both configured to cause a single media control operation to be implemented at the second electronic device. For example, if a user inputs a media control command into a mobile phone requesting that the song "Jessie's Girl" be presented by a second electronic device, such as a home media system, the mobile phone will send two media control requests that are each configured to cause the home media system to begin playback of "Jessie's Girl." Sending both media control requests increases the speed with which the second electronic device responds to the request and the reliability of the request being received. In some implementations, the second electronic device has already buffered some of the requested media content and can therefore begin presenting that content without needing to wait for the arrival of a media content stream from the server system, as discussed below. Also, the local and server media control requests need not contain identical data, but they are configured to cause the same media control operation to occur at the second electronic device. In some implementations, the media control operation is selected from the group consisting of: play, pause, skip, fast-forward, rewind, adjust an audio volume, change an order of items in a playlist, add items to a playlist, remove items from a playlist, adjust audio equalizer settings, set a user setting, and the like. In some implementations, the local and server media control requests include information specifying a particular electronic device from a group of available electronic devices to be controlled as the second electronic device.

In some implementations, the first electronic device provides a single user interface that allows a user both to select media content for presentation by the first electronic device and to generate media control requests configured to cause the media content to be presented by the second electronic device (512). For example, as described above, a user can control playback of media content at the device that is presenting the user interface (e.g., a mobile phone that is displaying a media player application) and also control playback of media content at a different device (e.g., a home media system or remote speaker) using the same application and/or user interface. Thus, the user need not switch between applications or user interface environments in order to control the various devices, including the device on which the user interface is presented.

In some implementations, the media content is selected from the group consisting of, but not limited to: an audio track, a video, an image, an audio playlist, and a video playlist. In some implementations, when the media content is a video, the video is presented on a display associated with the second electronic device (514). In some implementations, when the media content is an audio track, the audio track is presented on a speaker associated with the second electronic device (516).

Figure 6A:
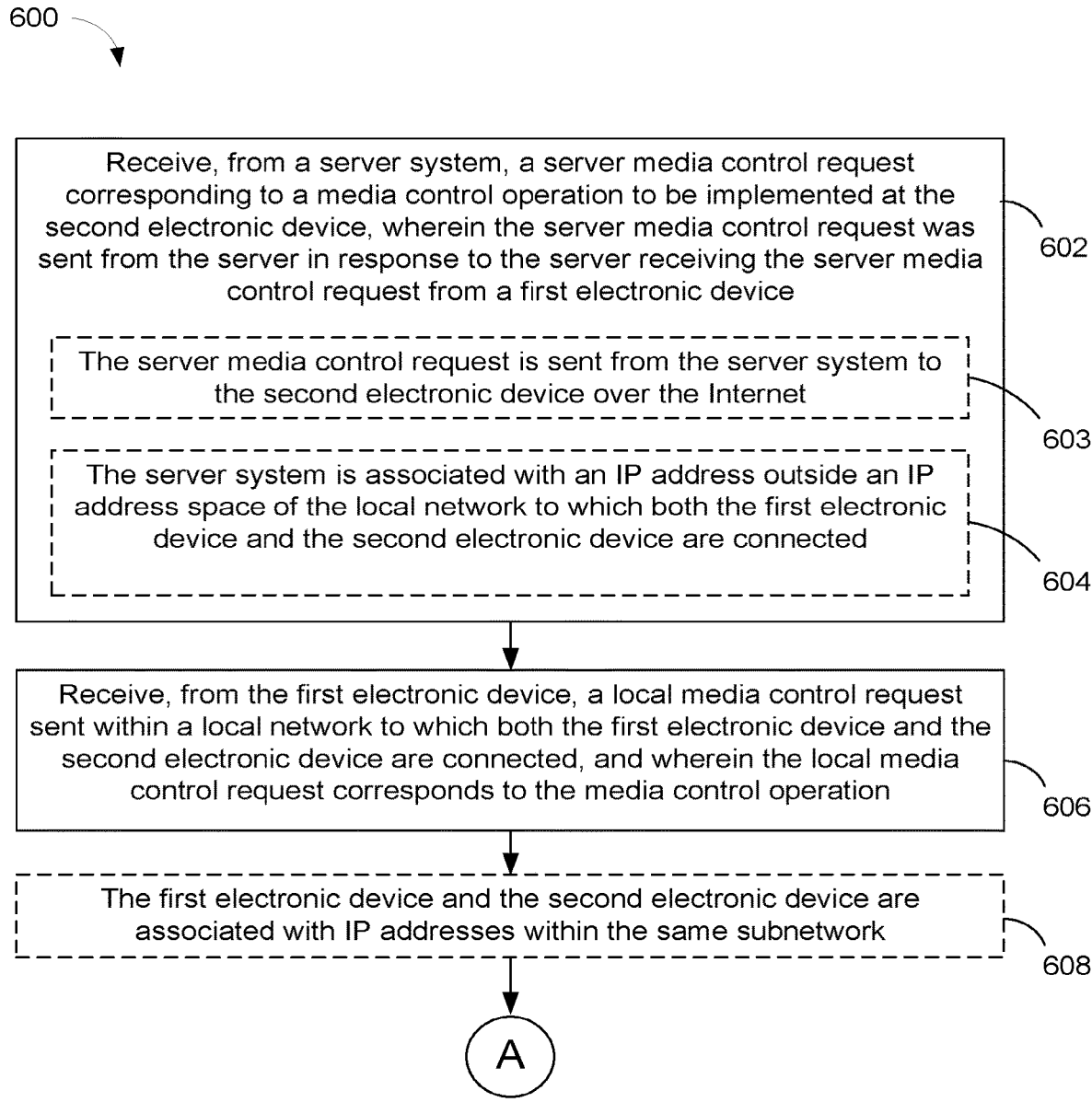
FIGS. 6A-6B are flow diagrams illustrating a method of controlling media presentation, performed by a second electronic device, in accordance with some implementations.
Figure 6B:
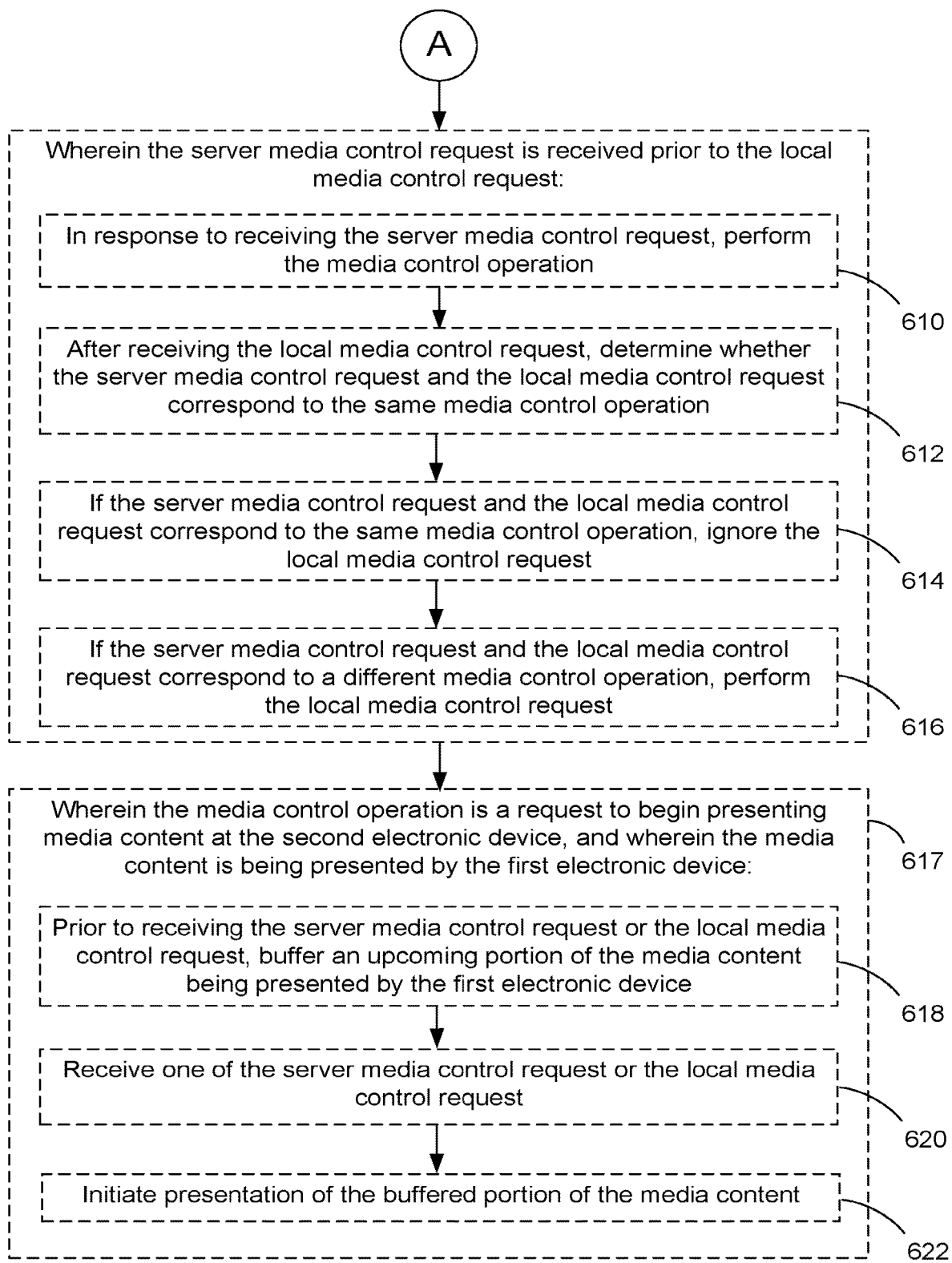

FIGS. 6A-6B are flow diagrams illustrating a method 600 of controlling media presentation at an electronic device, in accordance with some implementations. In some implementations, the method 600 is performed at a second electronic device having one or more processors and memory storing one or more programs for execution by the one or more processors (e.g., second electronic device 106-n, FIG. 1). For example, the second electronic device may be a home media system, television, computer, or the like. In some implementations, the method 600 corresponds to a method implemented in conjunction with and/or in response to the method 500.

In some implementations, the method 600 corresponds to an implementation where media control requests that are sent to the server system from the first electronic device (e.g., the server media control request 112, FIG. 2) are forwarded to the second electronic device without the server system attempting to perform the media control operation. Thus, the server system acts as a relay or forwarding service for a media control request from the first electronic device. This may be used in implementations where a media control request is only performed if the request originates from the device that is to perform the action (or that is to be impacted by the action). For example, a device acting as a remote control cannot alone cause the server to begin streaming media to a second electronic device, because the control request did not originate from the second electronic device. Rather, the second electronic device must itself make the request to the server. Accordingly, the server forwards the media control request to the second electronic device, and the second electronic device can then perform an operation to satisfy the request (e.g., requesting media content from the server, changing a media presentation setting, etc.).

With reference to FIG. 6A, a server media control request corresponding to a media control operation to be implemented at the second electronic device is received from a server system, wherein the server media control request was sent from the server in response to the server receiving the server media control request from a first electronic device (602). In some implementations, the server media control request is sent from the server system to the second electronic device over the Internet (603). In some implementations, the server system is associated with an IP address outside an IP address space of a local network to which both the first electronic device and the second electronic device are connected (604).

A local media control request sent within a local network to which both the first electronic device and the second electronic device are connected is received from the first electronic device, wherein the local media control request corresponds to the media control operation (606). In some implementations, the local network is a Local Area Network, as discussed above. In some implementations, the first electronic device and the second electronic device are associated with IP addresses within the same subnetwork (608). The local media control request is sent over any communication type that allows peer-to-peer communication between the two electronic devices without having to leave the local network. In some implementations, the local media control request is sent via Wi-Fi, BLUETOOTH, or the like.

Because the second electronic device may receive the server media control request and the local media control request from different sources and via different communication paths, the requests may not arrive in a consistent or predictable order. That is, in some cases, the local media control request may arrive before the server media control request, while in other cases, the order is reversed. However, a subsequently received media control request may not be a duplicate of the prior request, and so it should not be ignored simply because it was received shortly after another request. Accordingly, in some implementations, the second electronic device will determine whether to perform or ignore the media control requests based on various factors, as described with respect to FIG. 6B.

Method 600 continues on FIG. 6B. In some implementations, when the server media control request is received prior to the local media control request, the following steps are performed. The media control operation is performed in response to receiving a server media control request (610). After receiving a local media control request, it is determined whether the server media control request and the local media control request correspond to the same media control operation (612). If the server media control request and the local media control request correspond to the same media control operation, the local media control request is ignored (614). In some implementations, if the server media control request and the local media control request correspond to different media control operations, the local media control request is performed (616). In cases where the local media control request is received prior to the server media control request, steps similar to (610)-(616) are employed to determine whether to ignore or perform the server media control request. Thus, the second electronic device is prevented from performing the same media control operation twice in succession, thus preventing possible pauses, jumps, or other interruptions in the media content presentation caused by the processing of both the local and the server media control requests.

In some implementations, whether the server media control request and the local media control request correspond to the same media control operation is determined using timestamps. For example, in some implementations, the server media control request includes a first timestamp and the local media control request includes a second timestamp. In some implementations, the first and the second timestamp both correspond to a time at which the first electronic device issued the media control requests. In some implementations, the first timestamp corresponds to a time at which the server system received a server media control request from the first electronic device, and the second timestamp corresponds to a time at which the first electronic device issued the local media control request. Accordingly, determining that the server media control request and the local media control request correspond to the same media control operation includes comparing the first and the second timestamps. If the timestamps are the same or substantially similar, it is determined that the local media control request and the server media control request correspond to the same media control operation, and the local media control request is ignored. In some implementations, timestamps are substantially similar if they are within 1 second. In some implementations, they are substantially similar if they are within 5 seconds. Other times may be used depending on the needs of any specific implementation. In some implementations, other time ranges are used to determine if timestamps are considered substantially similar. If the timestamps are not the same or substantially similar, it is determined that server media control request and the local media control request do not correspond to the same media control operation, and the local media control request is performed.

As discussed above, it may be desirable for users to cause media content that is being presented at one device to be transferred to another device for presentation at that device. For example, a user listening to music on a mobile phone may decide to switch the playback device from the phone to a home stereo system. In the process of terminating presentation at one device and initiating presentation at another, however, processing and communication delays can cause pauses or gaps in presentation that diminish the overall user experience. Accordingly, in some implementations, the second electronic device (e.g., the device that is to begin presenting media content) buffers an upcoming portion of media content that is being presented at the first electronic device (e.g., the device that is currently presenting the media content). In some implementations, the second electronic device is configured to buffer the upcoming portion of media content that is being presented at the first electronic device when the first electronic device is connected to the same local network (e.g., a LAN, a BLUETOOTH connection, etc.), when the first electronic device is within a predetermined proximity to the second electronic device (e.g., within the same building, room, floor, etc., as determined by a GPS, for example), and the like. In some implementations, one or more of the devices, including the first and second electronic devices and the server system, are configured to determine when and whether to buffer/cache media content at the second electronic device. Buffering media content at a second electronic device is discussed further with reference to steps (617)-(622).

In some implementations, the media control operation corresponding to one or more media control requests is a request to begin presenting media content at the second electronic device while the media content is being presented by the first electronic device (617). Prior to receiving the server media control request or the local media control request, an upcoming portion of the media content being presented by the first electronic device is buffered at the second electronic device (618). For example, the second electronic device may continuously receive and store a portion of the media content that is being presented at the first electronic device. In some implementations, the second electronic device receives the media content for buffering from the server system. The media content may be sent from the server system via the Internet. In some implementations, the second electronic device receives the media content for buffering from the first electronic device. In these implementations, the media content may be sent from the first electronic device via the local network. In some implementations, the buffered media content has a lower bit-rate than media content that is being presented and/or streamed for current presentation, thus helping to reduce bandwidth and network usage for the buffering technique. In some implementations, where the media content is audio, it is presented at a bit-rate of either about 160 kbps or 320 kbps, and it is buffered at about 96 kbps. Other bit-rates may be used for the presentation bit-rate and the buffering bit-rate, depending on factors such as available network speeds and capabilities, distances between devices, device capabilities, user preferences, and the like.

In some implementations, one of the server media control request or the local media control request is received at the second electronic device (620), and, in response, presentation of the buffered portion of the media content is initiated at the second electronic device (622).

Accordingly, when the second electronic device receives a command to begin presenting the media content, the presentation can begin without the additional time necessary to initialize a media content stream or otherwise download or receive the media content in a way suitable for continuous presentation. In some implementations, the second electronic device buffers about 5 seconds of the media content that is being presented by the first electronic device. In some implementations, it buffers about 10 seconds of the media content. In some implementations, it buffers more or less time, depending on the needs of any specific implementation.

In some implementations, the media content continues to be presented by the first electronic device in substantial synchronization with the presentation by the second electronic device. In some implementations, the media content ceases to be presented by the first electronic device when presentation begins at the second electronic device (although it may still be cached/buffered at the first electronic device, in some implementations).

Figure 7:
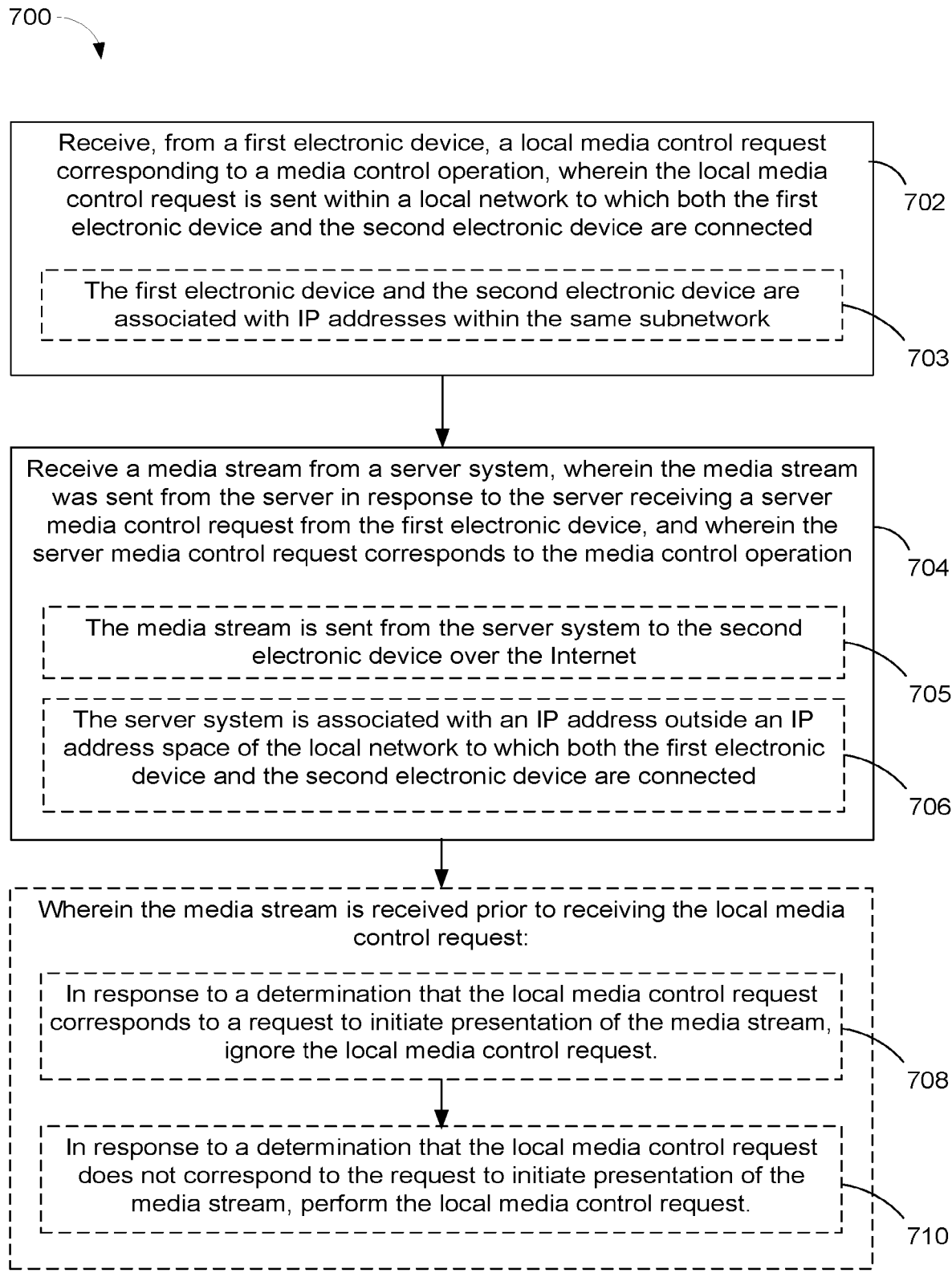
FIG. 7 is a flow diagram illustrating another method of controlling media presentation, performed by a second electronic device, in accordance with some implementations.

FIG. 7 is a flow diagram illustrating a method 700 of controlling media presentation at an electronic device in accordance with some implementations. In some implementations, the method 700 is performed at a second electronic device having one or more processors and memory storing one or more programs for execution by the one or more processors. For example, the second electronic device may be a home media system, television, computer, or the like. In some implementations, the method 700 corresponds to a method implemented in conjunction with and/or in response to the method 500. In some implementations, the method 700 corresponds to an implementation where media control requests that are sent to the server system (e.g., server system 120, FIG. 2) from the first electronic device (e.g., the server media control request 112, FIG. 2) are performed without first being forwarded to the second electronic device. Thus, the server system will take action when it receives a control request, even if the request originated from a different device than that which is to be acted upon. In some implementations, local media control requests (e.g., the local media control request 116, FIG. 2) are also received by the second electronic device after having been sent from the first electronic device, and are processed by the second electronic device when received, if appropriate.

With reference to FIG. 7, a local media control request corresponding to a media control operation is received from a first electronic device, wherein the local media control request is sent within a local network to which both the first electronic device and the second electronic device are connected (702). In some implementations, the local network is a Local Area Network, as discussed above. In some implementations, the first electronic device and the second electronic device are associated with IP addresses within the same subnetwork (703). The local media control request is sent using any communication type that allows communication between the two electronic devices without having to leave the local network. In some implementations, the local media control request is sent via Wi-Fi, BLUETOOTH, or the like.

A media stream is received from a server system, wherein the media stream was sent from the server in response to the server receiving a server media control request from the first electronic device, and wherein the server media control request corresponds to the media control operation (704). Accordingly, in this case, when the first electronic device requests a media control operation (e.g., initiated by a user or automatically), the second electronic device receives a local media control request, as well as a media stream that corresponds to that same media control request.

In some implementations, the media stream is sent from the server system to the second electronic device over the Internet (705). In some implementations, the server system is associated with an IP address outside an IP address space of a local network to which both the first electronic device and the second electronic device are connected (706).

Because the second electronic device receives both a media stream and a local media control request that may correspond to the same media control operation, the second electronic device should determine whether to perform a subsequently received local media control request. Accordingly, in some implementations, when the media stream is received prior to receiving the local media control request, the second electronic device determines whether to perform or ignore the local media control request. In some implementations, in response to a determination that the local media control request corresponds to a request to initiate presentation of the media stream, the local media control request is ignored (708). In some implementations, in response to a determination that the local media control request does not correspond to the request to initiate presentation of the media stream, the local media control request is performed (710). Thus, the second electronic device is prevented from performing the same media control operation twice in succession, thus preventing possible pauses, jumps, or other interruptions in the media content presentation.

In some implementations, whether the local media control request corresponds to a request to initiate presentation of the media stream is determined using timestamps. For example, in some implementations, the media stream includes a first timestamp, and the local media control request includes a second timestamp. In some implementations, the first and the second timestamp both correspond to a time at which the first electronic device issued the media control requests. In some implementations, the first timestamp corresponds to a time at which the server system received a media control request from the first electronic device, and the second timestamp corresponds to a time at which the first electronic device issued the local media control request. Accordingly, determining that the local media control request corresponds to a request to initiate presentation of the media stream includes comparing the first and the second timestamps. If the timestamps are the same or substantially similar, it is determined that the local media control request corresponds to the media stream, and the local media control request is ignored. In some implementations, timestamps are substantially similar if they are within 1 second. In some implementations, they are substantially similar if they are within 5 seconds. In some implementations, other time ranges are used to determine if timestamps are considered substantially similar. If the timestamps are not the same or substantially similar, it is determined that the local media control request corresponds to the media stream, and the local media control request is performed.

Figure 8:
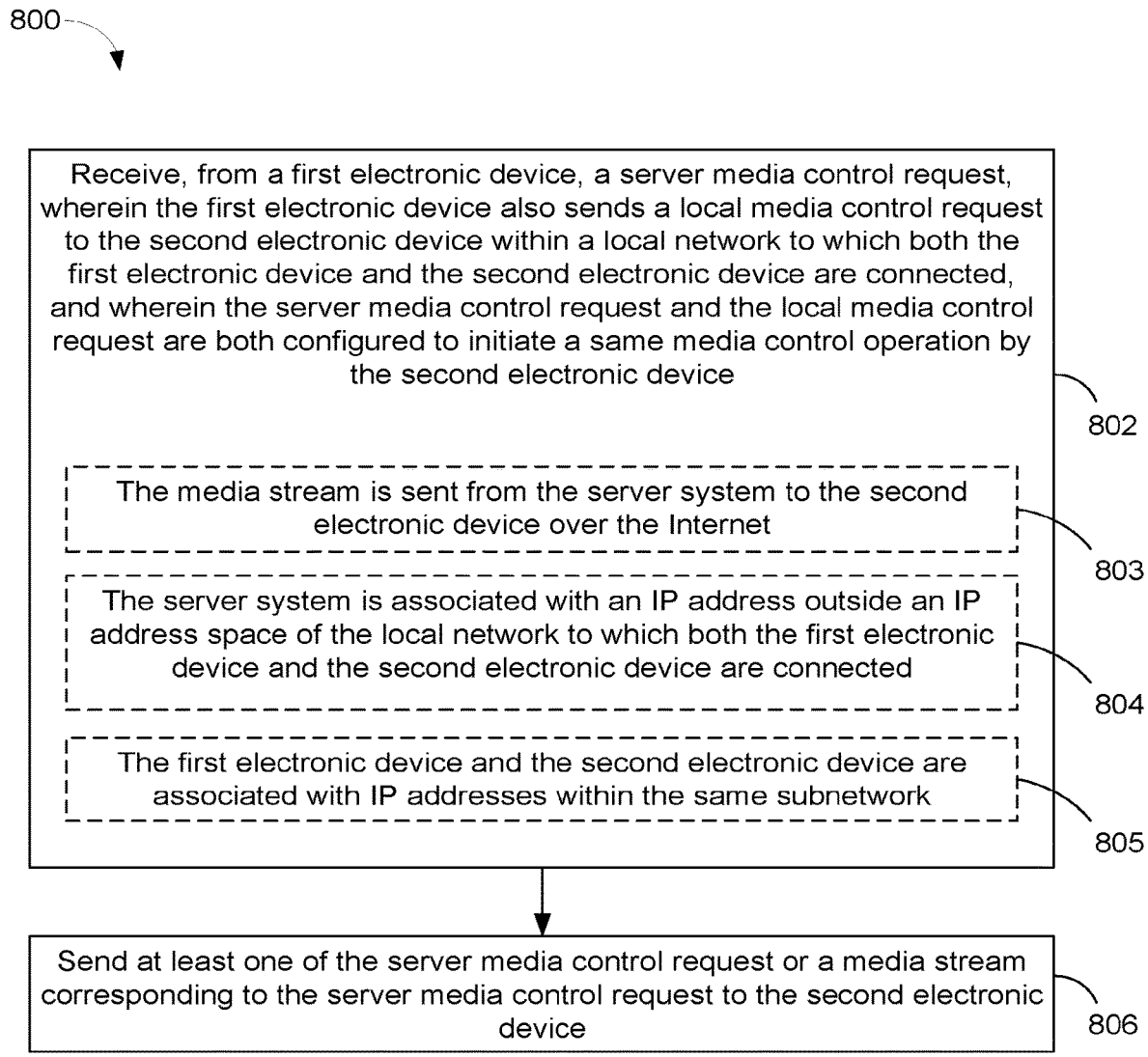
FIG. 8 is a flow diagram illustrating a method of controlling media presentation, performed by a server, in accordance with some implementations.

FIG. 8 is a flow diagram illustrating a method 800 of controlling media presentation, in accordance with some implementations. In some implementations, the method 800 is performed at a server system having one or more processors and memory storing one or more programs for execution by the one or more processors (e.g., server system 120, FIGS. 1-3).

A server media control request is received from a first electronic device (802). The first electronic device also sends a local media control request to the second electronic device within a local network to which both the first electronic device and the second electronic device are connected. The server media control request and the local media control request are both configured to initiate a same media control operation by the second electronic device. As described above, in some implementations, the server media control request is sent to the server system over the Internet (803). In some implementations, the server system is associated with an IP address outside an IP address space of a local network to which both the first electronic device and the second electronic device are connected (804). In some implementations, the local network is a Local Area Network. In some implementations, the first electronic device and the second electronic device are associated with IP addresses within the same subnetwork (805).

At least one of the server media control request or a media stream corresponding to the server media control request is sent to the second electronic device (806). In some cases, the server forwards all the server media control requests to the second electronic device. In some cases, the server performs the media control operation requested by the server media control request. For example, if the server media control request requests playback of media content at the second electronic device (e.g., a home media system), the server streams the media content to the second electronic device. In some implementations, the server performs some media control requests, but forwards others to the second electronic device. For example, requests to control playback of media content (including commands such as play, pause, skip, repeat, etc.) are performed by the server, while requests that relate specifically to the second electronic device (e.g., change the volume, change an input source, etc.) are forwarded to the second electronic device.

FIGS. 9-12 are flow diagrams illustrating a method for previewing media content, in accordance with some implementations. Each of the operations shown in FIGS. 9-12 may correspond to instructions stored in a computer memory or computer readable storage medium. Optional operations are indicated by dashed lines (e.g., boxes with dashed-line borders). Moreover, each of the operations shown in FIGS. 9-12 may be executed by any appropriate device or combination of devices, including first electronic devices 102-n, second electronic devices 106-n, and/or a server system 120.

Figure 9:
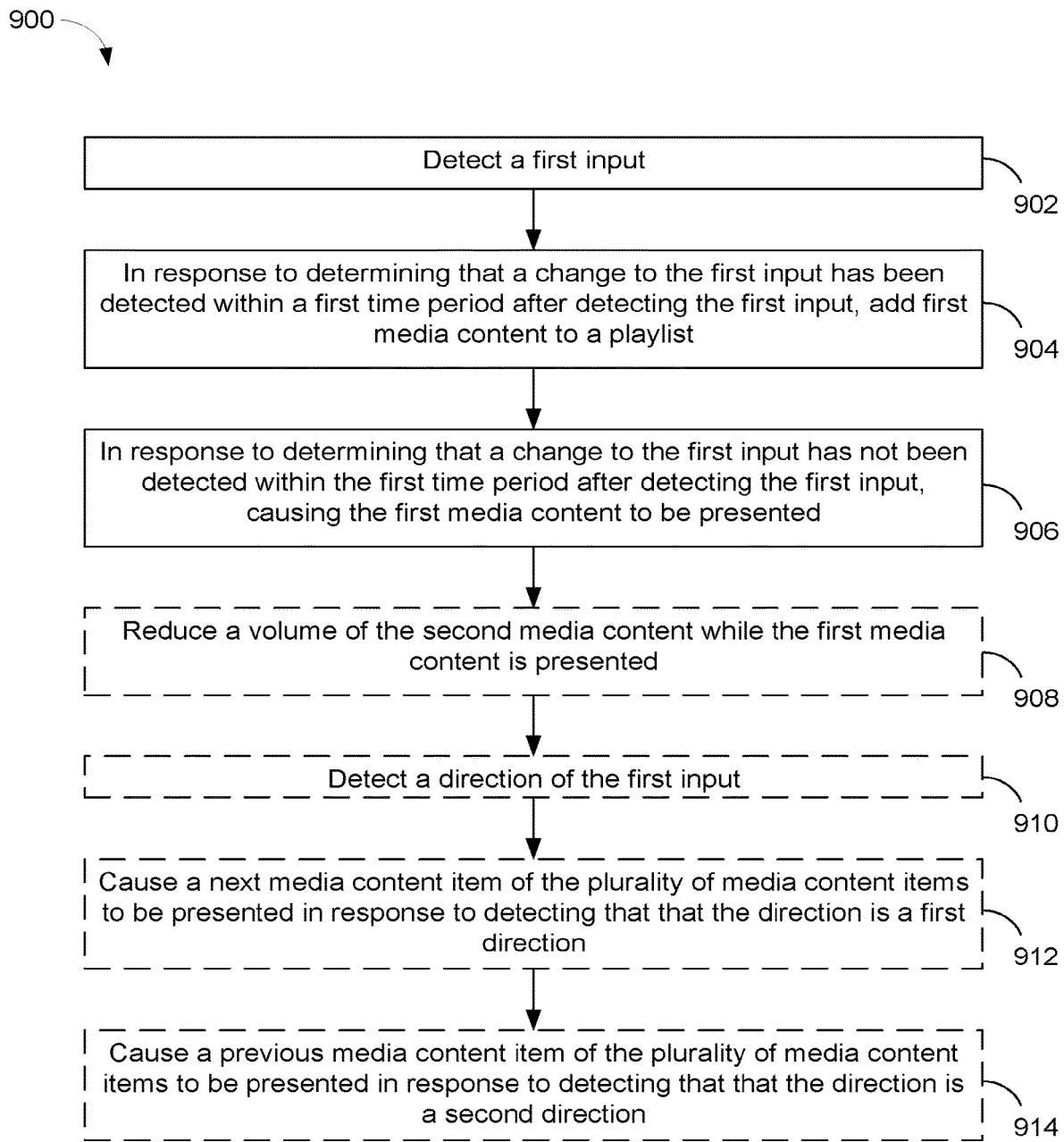
FIGS. 9-12 are flow diagrams illustrating methods of previewing media content, in accordance with some implementations.

With reference to FIG. 9, in some implementations, the method 900 is performed at a first electronic device having one or more processors and memory storing instructions for execution by the one or more processors. In some implementations, the electronic device corresponds to the first electronic device 102-1, discussed above. A first input is detected (902). In some implementations, the first input is a touch input including a contact with a touch-sensitive surface. In some implementations, the first input is a mouse click-down event.

In response to determining that a change to the first input has been detected within a first time period after detecting the first input, first media content is added to a playlist (904). In some implementations, the first input is detected (902) during presentation of second media content, and the playlist includes the second media content. Thus, in these implementations, the change to the first input causes the first media content to be added to a playlist that is currently being presented. In some implementations, adding the first media content to the playlist comprises adding the first media content to an end of the playlist. In some implementations, adding the first media content to the playlist comprises adding the first media content as next media content in the playlist. In some implementations, adding the first media content to the playlist comprises replacing existing content in the playlist with the first media content.

In some implementations, the change to the first input is a liftoff from a touch-sensitive surface, such as a touchscreen. In some implementations, the change to the first input is an additional contact with the touch-sensitive surface, wherein the contact and the additional contact correspond to distinct contact areas of the touch-sensitive surface. In some implementations, the change to the first input is a mouse click-release event. In some implementations, the change to the first input is a gesture, swipe, cursor movement, or multi-touch input.

In some implementations, the first time period is 0.5 seconds. In some implementations, the first time period is 1 second. In some implementations, the first time period is 2 seconds.

In response to determining that a change to the first input has not been detected within the first time period after detecting the first input, the first media content is caused to be presented to the user (906). In some implementations, causing the first media content to be presented to the user includes presenting the media content on the same device that received the first input. In some implementations, it includes sending a request to another device to initiate presentation of the media content.

In some implementations, causing the first media content to be presented includes reducing a volume of the second media content while the first media content is presented (908). In some implementations, reducing the volume includes muting the second media content. In some implementations, reducing the volume includes pausing the second media content. In some implementations, causing the first media content to be presented also includes ceasing presentation of the first media content in response to detecting a change to the first input after the first time period.

In some implementations, the first media content comprises a plurality of media content items. In such instances, a directional component of the first input can be used to navigate among individual media content items of the first media content. For example, in some implementations, the first media content is a playlist, album, listing of podcasts, or the like. In some implementations, the method further includes detecting a direction of the first input (910). A next media content item of the plurality of media content items is caused to be presented in response to detecting that that the direction is a first direction (912). In some implementations, a previous media content item of the plurality of media content items is caused to be presented in response to determining that the direction is a second direction (914). In some implementations, the first direction corresponds to an input movement having a predetermined directional component in a right-hand direction. In some implementations, the second direction corresponds to an input movement having a predetermined directional component in a left-hand direction. In some implementations, the first direction corresponds to an input movement having a predetermined directional component in a down direction. In some implementations, the second direction corresponds to an input movement having a predetermined directional component in an up direction.

Figure 10:
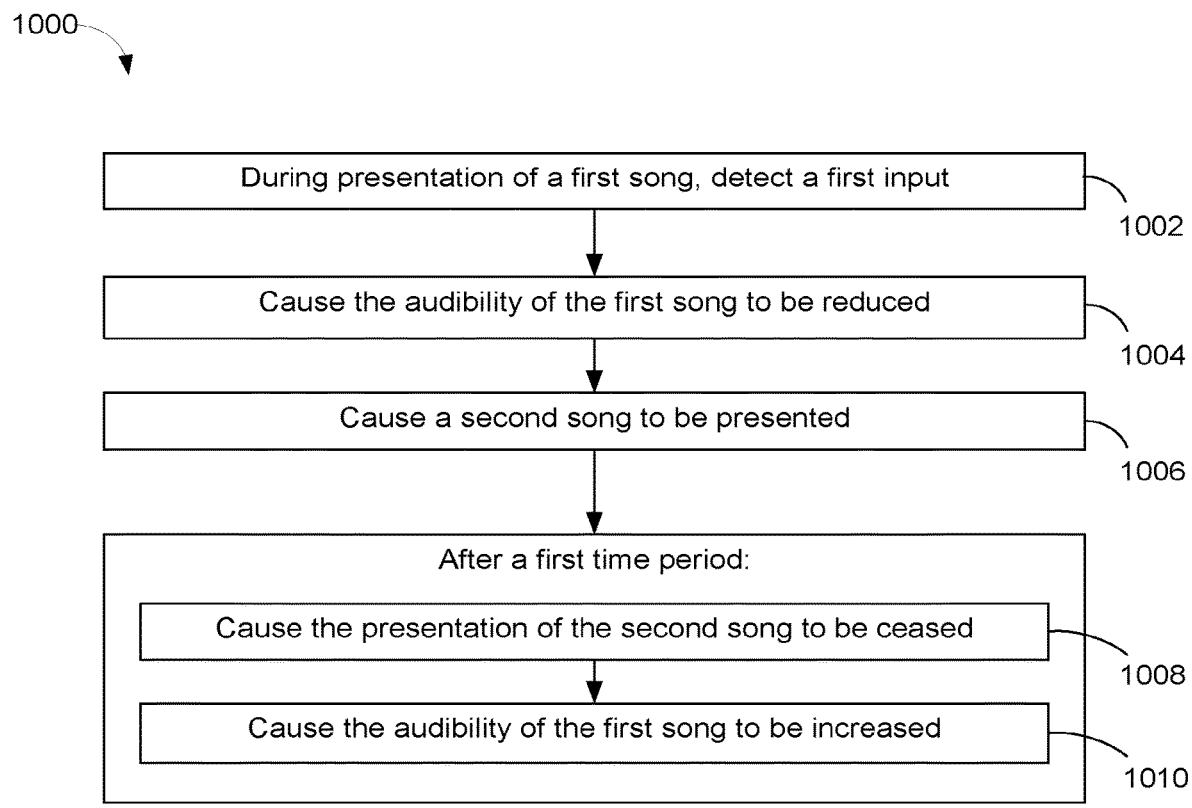

With reference to FIG. 10, in some implementations, the method 1000 is performed at a first electronic device having one or more processors and memory storing instructions for execution by the one or more processors. In some implementations, the electronic device corresponds to the first electronic device 102-1, discussed above. A first input is detected during presentation of a first song (1002). Various inputs that may be detected are described above. The audibility of the first song is reduced (1004). In some implementations, reducing the audibility of the first song includes reducing the volume of the first song; in some embodiments it includes muting the first song; in some implementations, it includes pausing the first song. In some implementations, reducing the audibility of the first song includes sending a command to a remote device, where the command is configured to cause that device to reduce the audibility of the first song.

A second song is caused to be presented (1006). In some implementations, causing the second song to be presented includes beginning playback of the second song at the device. In some implementations, causing the second song to be presented includes sending a request to a remote device to initiate playback of the second song.

The method also includes, after a first time period, causing the presentation of the second song to be ceased (1008), and causing the audibility of the first song to be increased (1010). In some implementations, the first time period corresponds to the duration of a maintained input. In some implementations, the end of the first time period corresponds to an expiration of a timer. In some implementations, the end of the first time period corresponds to an end of a preview portion of the second song. In some implementations, the end of the first time period corresponds to detecting a change to the first input, such as a liftoff from a touch-sensitive surface or a mouse click-release event.

Figure 11:
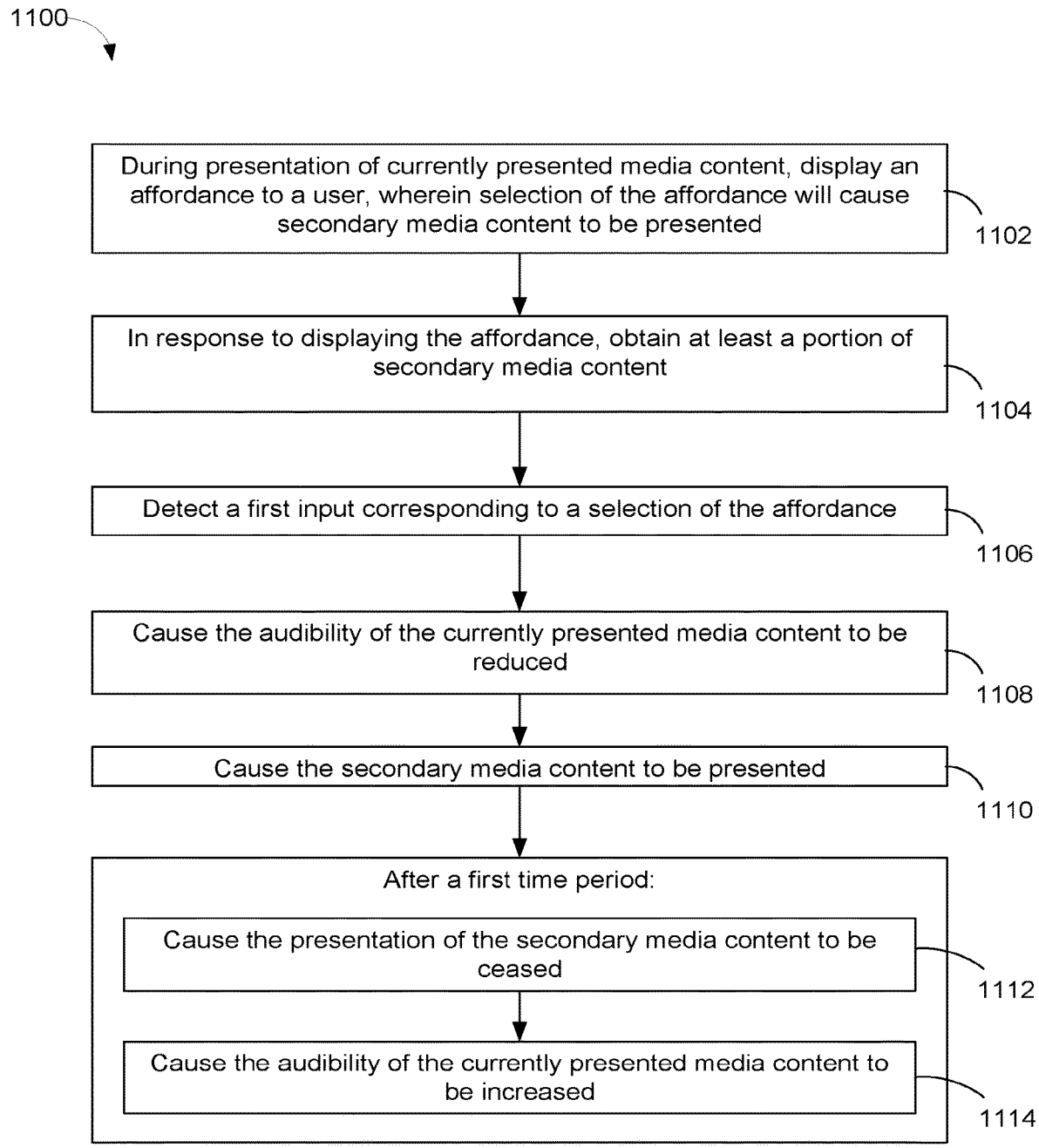

With reference to FIG. 11, in some implementations, the method 1100 is performed at a first electronic device having one or more processors and memory storing instructions for execution by the one or more processors. In some implementations, the electronic device corresponds to the first electronic device 102-1, discussed above. During presentation of currently presented media content, an affordance is displayed to a user, wherein selection of the affordance will cause secondary media content to be presented (1102). In some implementations, the affordance corresponds to an icon (e.g., a thumbnail image of an album cover or movie poster), graphic, or text. In response to displaying the affordance, at least a portion of secondary media content is obtained (1104). In some implementations, the portion of the secondary media content is received by the same device that displayed the affordance. In some implementations, it is received by a different device, such as a second electronic device 106-n. In some implementations, it is sent by a server system remote from the device that displayed the affordance, such as server system 120.

In some implementations, the secondary media content includes multiple media content items, and obtaining at least a portion of the secondary media content includes obtaining at least a portion of each media content item of the secondary media content. For example, if the secondary content corresponds to an album, at least a part of each track is obtained for caching/buffering by a presentation device. In some implementations, obtaining at least a portion of the secondary media content includes obtaining an initial media content item and the next media content item in the playlist. In some implementations, obtaining at least a portion of the secondary media content includes obtaining an initial media content item and the next two media content items in the playlist.

A first input corresponding to a selection of the affordance is detected (1106). In some implementations, the first input corresponds to any of those inputs discussed above (e.g., mouse clicks or hovers, touch events and gestures, etc.). The audibility of the currently presented media content is reduced (1108). In some implementations, this includes muting, lowering the volume or brightness of, and/or pausing the currently presented media content. The secondary media content is presented (1110). After a first time period, the presentation of the secondary media content is ceased (1112), and the audibility of the currently presented media content is increased (1114). In some implementations, the first time period corresponds to the duration of a maintained input. In some implementations, the end of the first time period corresponds to an expiration of a timer. In some implementations, the end of the first time period corresponds to an end of a preview portion of the second song. In some implementations, the end of the first time period corresponds to detecting a change to the first input, such as a liftoff from a touch-sensitive surface or a mouse click-release event.

Figure 12:
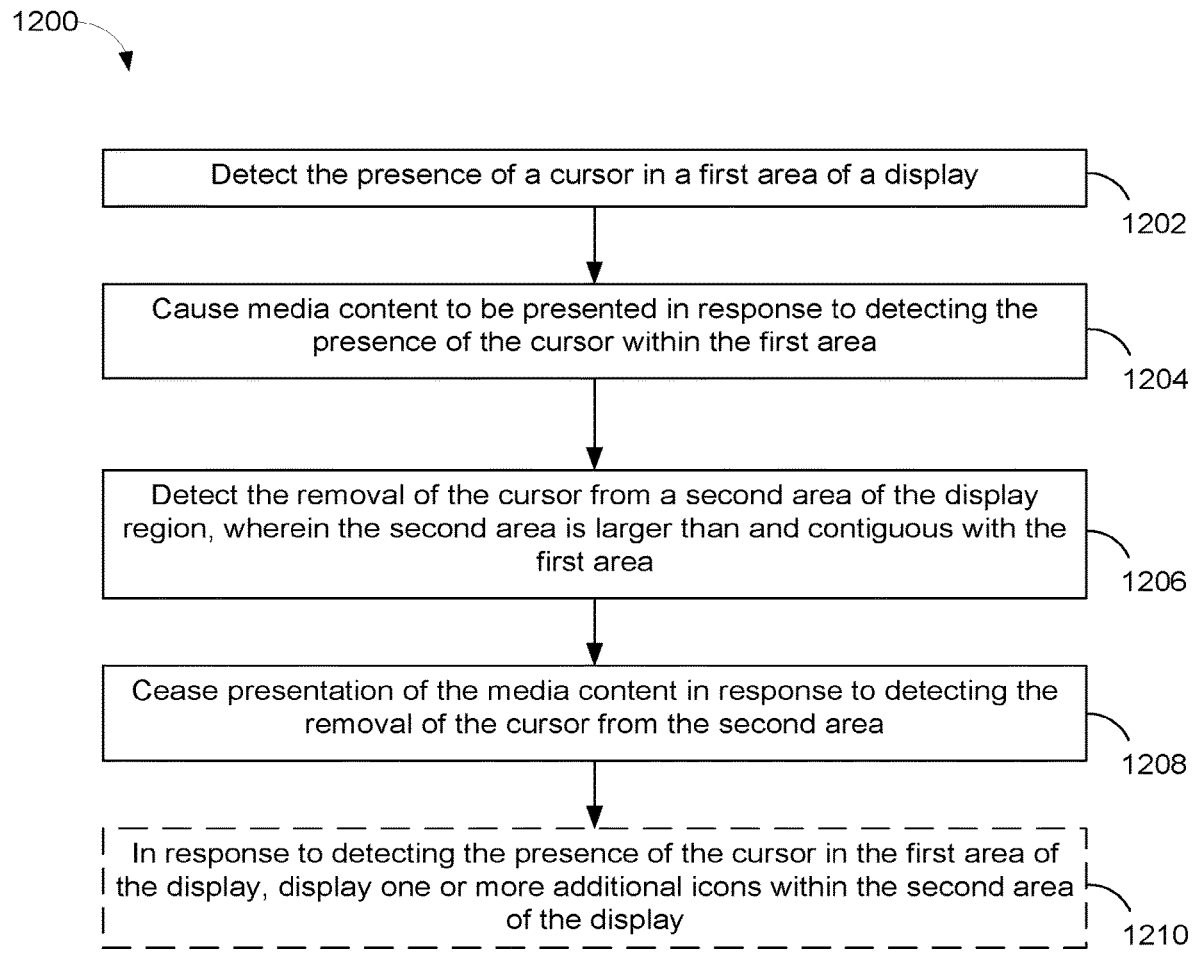

With reference to FIG. 12, in some implementations, the method 1200 is performed at a first electronic device having one or more processors and memory storing instructions for execution by the one or more processors. In some implementations, the electronic device corresponds to the first electronic device 102-1, discussed above. The presence of a cursor is detected in a first area of a display (1202). In some implementations, the first area of the display corresponds to an icon (e.g., a thumbnail image of an album cover or movie poster), graphic, or text. In some implementations, the first area is displayed partially or entirely within, adjacent to, and/or contiguous with a second area of the display region. In some implementations, the second area of the display region corresponds to a media content description area (e.g., a tile, as discussed above), including, for example, album art, movie stills, content metadata, artist information, artist photographs, and the like.

Media content is presented in response to detecting the presence of the cursor within the first area (1204). In some implementations, the media content corresponds to a preview of the media content identified and/or described in the media content description area. In some implementations, the media content is presented after the cursor has been detected in the first area for a time period, such as 0.5 seconds, 1 second, 2 seconds, or any other appropriate time period.

The removal of the cursor from a second area of the display region is detected (1206), where the second area is larger than and contiguous with the first area. In some implementations, the second area shares at least one border with the first area.

In some implementations, the second area completely encompasses the first area on all sides.

Presentation of the media content is ceased in response to detecting the removal of the cursor from the second area (1208). Thus, in some implementations, after the media content is presented—in response to detecting the cursor in the first area—it will continue to be presented until the cursor is removed from the larger second area.

In some implementations, in response to detecting the presence of the cursor in the first area of the display, one or more additional icons are displayed within the second area of the display (1210). In some implementations the one or more additional icons include media playback controls. In some implementations, the media playback controls are selected from the group consisting of: play, pause, stop, skip forward, skip backward, add to playlist (e.g., add as next, add to end, replace playlist), and audio track indices.

Figure 15:
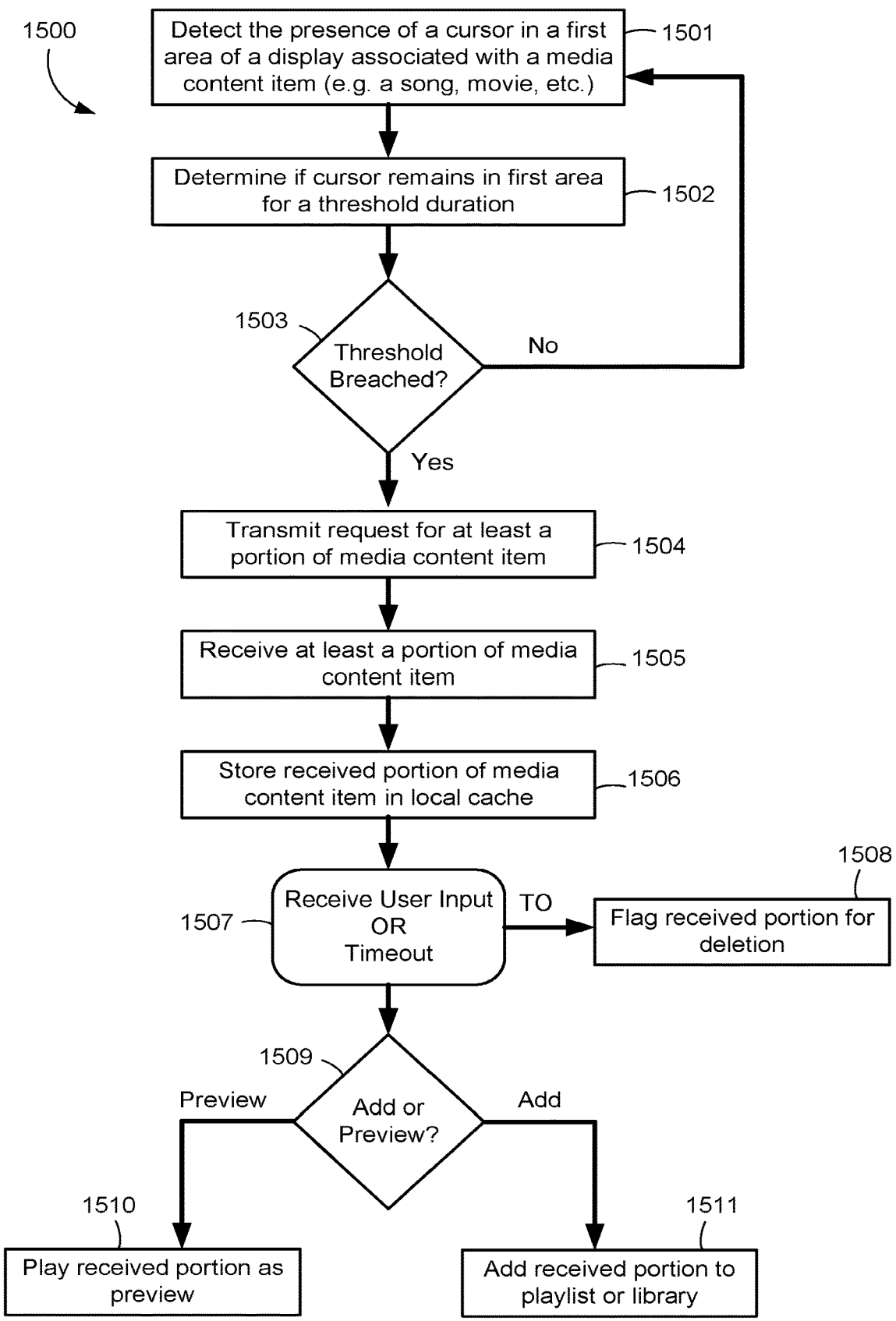
FIG. 15 is a flow diagram illustrating a method of pre-fetching at least a portion of media content for preview and/or addition to a play list.

FIG. 15 is a flow diagram illustrating a method 1500 of pre-fetching at least a portion of media content for preview and/or addition to a play list. In some implementations, the method 1500 is performed by performed at a first electronic device having one or more processors and memory storing instructions for execution by the one or more processors. In some implementations, the electronic device corresponds to the first electronic device 102-1, discussed above. The method 1500 includes detecting the presence of a user controlled cursor (or the like) in a first area of a display associated with a media content item (1501). For example, in some implementations, the method includes detecting that the user is using a peripheral control device (e.g. a stylus, track ball, a touch pad, a mouse, a touch screen, etc.) to "hover" a displayed cursor on a window, a sub-window, a frame or a tile associated with a song and/or a video file. In some implementations, a window, a sub-window, a frame or a tile comprises a preview pane in which one or more media content items (i.e., audio files, video files, images, etc.) are displayed.

Subsequently, the method 1500 optionally includes determining if the user controlled cursor remains in the first area for a duration threshold (1502). For example, in some implementations, the method includes determining if the cursor is hovering over a preview pane for a threshold amount of time. As such, the method 1500 includes determining if the duration threshold has been breached before proceeding (1503). If the threshold has not been breached ("No" path from 1503), the cursor has left the first area and the method circles back to the portion represented by block 1501. On the other hand, if the threshold has been breached ("Yes" path from 1503), the method 1500 includes transmitting a request for at least a portion of the media content item represented in the first area (1504). For example, in some implementations, the method includes transmitting a request for at least a portion of a song (i.e., audio file) represented by a graphic in a preview pane. In some implementations, a preview version of the media content item is available. In some implementations, the full version of the media content item is available. In some implementations, a preview version of an audio or video file includes less than the entirety of a full version (e.g. the first minute of a song). In some implementations, a preview version of an audio or video file includes a lower quality version of the full quality version.

In response to the transmitted request, the method 1500 includes receiving a portion of the media content item (1505). The method 1500 includes storing the received portion in a local cache (1506). Having stored the received portion, the method 1500 includes waiting to receive an input from a user indicative of the user making a selection with respect to the media content item before a local timer expires (1507). If the user does not make a selection before the local timer expires ("TO" path from 1507), the method 1500 includes flagging the received portion of the media content item for deletion (1508). In some implementations, flagged content is deleted after a predetermined amount of time and/or when the local cache reaches capacity. On the other hand, if the user makes a selection ("UP" path from 1507), the method includes determining whether the user selection indicates that the user has chosen to preview the media content item or add the media content item to a library or playlist (1509).

If the user input indicates that the user has selected a preview ("Preview" path from 1509), the method 1500 includes playing the received portion of the media content item until the user provides another input or until the received portion is over (1510). In some implementations, a preview is a predetermined excerpt of pre-fetched full version. In other words, a full version is downloaded in the pre-fetch method but only a portion of it is made available for a preview using software permission controls. On the other hand, if the user input indicates that the user has selected to add the media content item to a library or playlist ("Add" path from 1509), the method 1500 includes adding the media content item to the library or playlist (1511). In some implementations, adding the media content item includes transmitting a request for a full version when the full version was not provided in the pre-fetch routine. In some implementations, addition the media content item includes changing the software permission controls so that the user has access to a full version of the media content item received during the pre-fetch routine.

Figure 16:
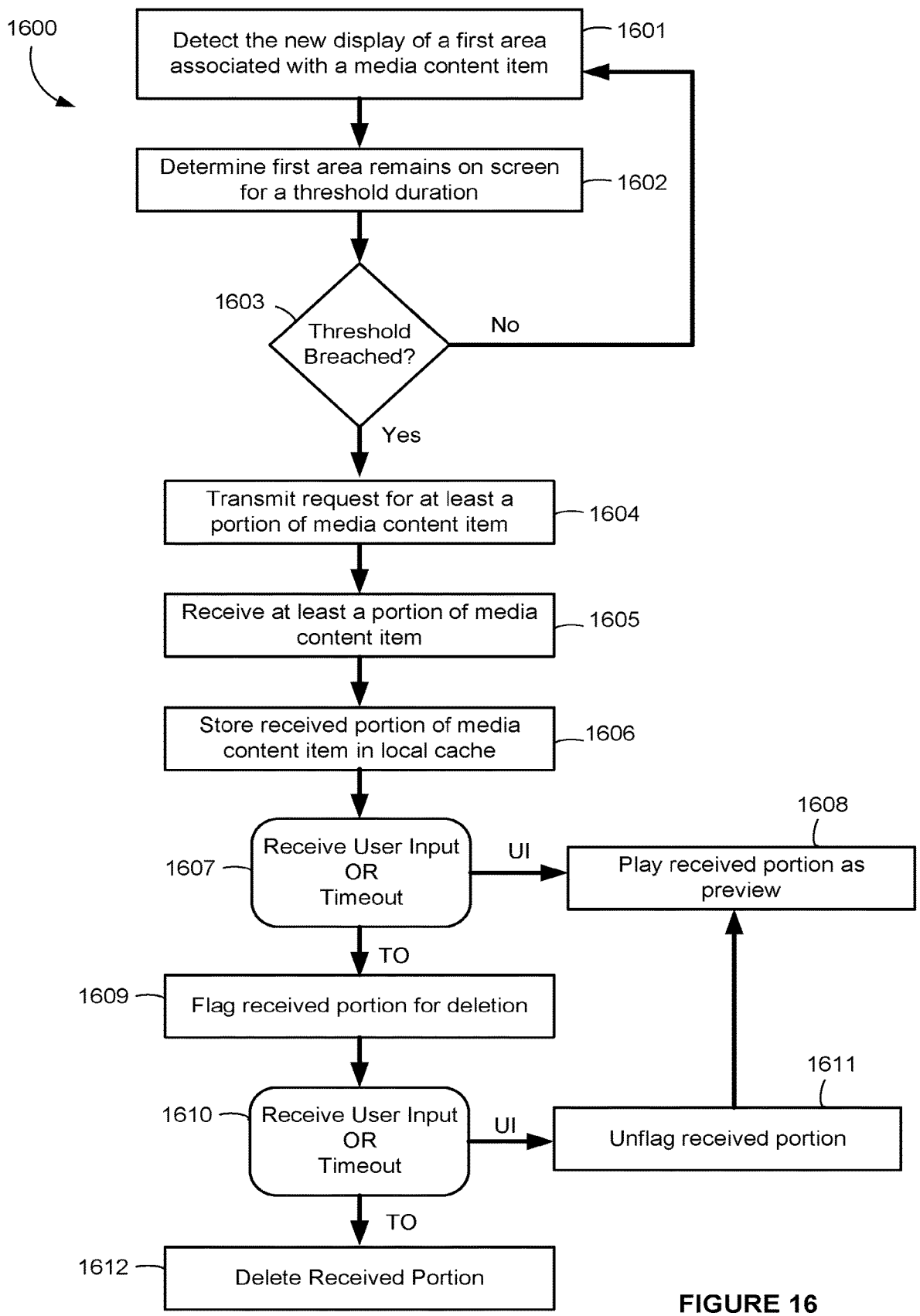
FIG. 16 is a flow diagram illustrating a method of pre-fetching at least a portion of media content for preview and/or addition to a play list.

FIG. 16 is a flow diagram illustrating a method 1600 of pre-fetching at least a portion of media content for preview and/or addition to a play list. In some implementations, the method 1600 is performed by performed at a first electronic device having one or more processors and memory storing instructions for execution by the one or more processors, such as for example, a smartphone or tablet device. In some implementations, the electronic device corresponds to the first electronic device 102-1, discussed above. The method 1600 includes detecting the new display of a first area associated with a media content item (1601). For example, in some implementations, the method includes detecting that the user has controlled the display to reveal a portion of a website or application that was not previously visible on the device display, and that newly displayed portion is associated with a song and/or a video file. In some implementations, the portion is included in a window, a sub-window, a frame or a tile and comprises a preview pane in which one or more media content items (i.e., audio files, video files, images, etc.) are displayed.

Subsequently, the method 1600 optionally includes determining if the first area remains visible on the device display for a duration threshold (1602). As such, the method 1600 includes determining if the duration threshold has been breached before proceeding (1603). If the threshold has not been breached ("No" path from 1603), the user has controlled the display so that the first area is no longer visible and the method circles back to the portion represented by block 1601. On the other hand, if the threshold has been breached ("Yes" path from 1603), the method 1600 includes transmitting a request for at least a portion of the media content item represented in the first area (1604). For example, in some implementations, the method includes transmitting a request for at least a portion of a song (i.e., audio file) represented by a graphic in a preview pane. In some implementations, the full version of the media content item is available. In some implementations, a preview version of the media content item is available. In some implementations, a preview version of an audio or video file includes less than the entirety of a full version (e.g. the first minute of a song). In some implementations, a preview version of an audio or video file includes a lower quality version of the full quality version.

In response to the transmitted request, the method 1600 includes receiving a portion of the media content item (1605). The method 1600 includes storing the received portion in a local cache (1606). Having stored the received portion, the method 1600 includes waiting to receive an input from a user indicative of the user making a selection with respect to the media content item before a local timer expires (1607). If the user input indicates that the user has selected a preview ("UP" path from 1607), the method 1600 includes playing the received portion of the media content item until the user provides another input or until the received portion is over (1608). In some implementations, a preview is a predetermined excerpt of pre-fetched full version. In other words, a full version is downloaded in the pre-fetch method but only a portion of it is made available for a preview using software permission controls.

On the other hand, if the user does not make a selection before the local timer expires ("TO" path from 1607), the method 1600 includes flagging the received portion of the media content item for deletion (1609). In some implementations, flagged content is deleted after a predetermined amount of time and/or when the local cache reaches capacity.

Having flagged the received portion for deletion, the method 1600 includes waiting to receive an input from a user indicative of the user making a selection with respect to the media content item before a local timer expires (1610). If the user does not make a selection before the local timer expires ("TO" path from 1610), the method 1600 includes deleting the flagged received portion of the media content item (1612). On the other hand, if the user input indicates that the user has selected a preview ("UI" path from 1610), the method 1600 includes unflagging the received portion of the media content item (1611) and playing the received portion in preview mode until the user provides another input or until the received portion is over (1608).

The methods illustrated in FIGS. 5-12, 15 and 16 may be governed by instructions that are stored in a computer readable storage medium and that are executed by at least one processor of at least one server. Each of the operations shown in FIGS. 5-12, 15 and 16 may correspond to instructions stored in a non-transitory computer memory or computer readable storage medium. In various implementations, the non-transitory computer readable storage medium includes a magnetic or optical disk storage device, solid state storage devices, such as Flash memory, or other non-volatile memory device or devices. The computer readable instructions stored on the non-transitory computer readable storage medium may be in source code, assembly language code, object code, or other instruction format that is interpreted and/or executable by one or more processors.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components.

These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. An electronic device, comprising:
one or more processors; and
memory storing one or more programs, wherein the one or more programs are configured to be executed by the one or more processors, the one or more programs including instructions for:
presenting, on a first playback device coupled with the electronic device, a first media content item;
receiving an input to preview a second media content item;
determining whether the electronic device is in a first mode of operation for shared presentation of media content;
in accordance with a determination that the electronic device is in the first mode of operation for shared presentation of media content:
while the first media content item is presented on the first playback device, presenting a preview of the second media content item on a second playback device distinct from the first playback device;
in accordance with a determination that the electronic device is not in the first mode of operation for shared presentation of media content:
ceasing presentation of the first media content item;
presenting the preview of the second media content item; and
after presenting the preview of the second media content item, resuming presentation of the first media content item.

2. The electronic device of claim 1, wherein the first mode of operation for shared presentation comprises routing a playlist that includes media content items for presentation to the first playback device.

3. The electronic device of claim 1, wherein in accordance with a determination that the electronic device is in the first mode of operation, continuing presentation of the first media content item while presenting the preview of the second media content item.

4. The electronic device of claim 3 wherein continuing presentation of the first media content item comprises not pausing, muting, or lowering a volume of the first media content item.

5. The electronic device of claim 1, wherein the second playback device comprises a headphone jack or built-in speaker of the electronic device.

6. The electronic device of claim 1, wherein the preview is presented while receiving the input and the preview ends in accordance with the input ceasing.

7. The electronic device of claim 1, wherein the first mode of operation for shared presentation is a disc jockey (DJ) mode.

8. The electronic device of claim 1, wherein the preview of the second media content item is presented on the first playback device.

9. A computer-implemented method, comprising:
at an electronic device with one or more processors and memory storing one or more programs that are configured to be executed by the one or more processors:
presenting, on a first playback device coupled with the electronic device, a first media content item;
receiving an input to preview a second media content item;
determining whether the electronic device is in a first mode of operation for shared presentation of media content;
in accordance with a determination that the electronic device is in the first mode of operation for shared presentation of media content:
while the first media content item is presented on the first playback device, presenting a preview of the second media content item on a second playback device distinct from the first playback device;
in accordance with a determination that the electronic device is not in the first mode of operation for shared presentation of media content:
ceasing presentation of the first media content item;
presenting the preview of the second media content item; and
after presenting the preview of the second media content item, resuming presentation of the first media content item.

10. The method of claim 9, wherein the first mode of operation for shared presentation comprises routing a playlist that includes media content items for presentation to the first playback device.

11. The method of claim 9, wherein in accordance with a determination that the electronic device is in the first mode of operation, continuing presentation of the first media content item while presenting the preview of the second media content item.

12. The method of claim 11, wherein continuing presentation of the first media content item comprises not pausing, muting, or lowering a volume of the first media content item.

13. The method of claim 9, wherein the second playback device comprises a headphone jack or built-in speaker of the electronic device.

14. The method of claim 9, wherein the preview is presented while receiving the input and the preview ends in accordance with the input ceasing.

15. The method of claim 9, wherein the first mode of operation for shared presentation is a disc jockey (DJ) mode.

16. The method of claim 9, wherein the preview of the second media content item is presented on the first playback device.

17. A non-transitory computer readable storage medium storing at least one program configured for execution by at least one processor of an electronic device, the at least one program comprising instructions to:
present, on a first playback device coupled with the electronic device, a first media content item;
receive an input to preview a second media content item;
determine whether the electronic device is in a first mode of operation for shared presentation of media content;
in accordance with a determination that the electronic device is in the first mode of operation for shared presentation of media content:
while the first media content item is presented on the first playback device, present a preview of the second media content item on a second playback device distinct from the first playback device;
in accordance with a determination that the electronic device is not in the first mode of operation for shared presentation of media content:
cease presentation of the first media content item;
present the preview of the second media content item; and
after presenting the preview of the second media content item, resume presentation of the first media content item.

18. The non-transitory computer readable storage medium of claim 17, wherein the first mode of operation for shared presentation comprises routing a playlist that includes media content items for presentation to the first playback device.

19. The non-transitory computer readable storage medium of claim 17, wherein in accordance with a determination that the electronic device is in the first mode of operation, continuing presentation of the first media content item while presenting the preview of the second media content item.

20. The non-transitory computer readable storage medium of claim 19, wherein continuing presentation of the first media content item comprises not pausing, muting, or lowering a volume of the first media content item.

* * * * *